United States Patent
Sahinoglu et al.

(10) Patent No.: US 10,855,352 B2
(45) Date of Patent: Dec. 1, 2020

(54) BINNING-BASED TRANSMIT BEAMFORMING FOR WIRELESS COMMUNICATION SYSTEMS

(71) Applicant: Avago Technologies International Sales Pte. Limited, Singapore (SG)

(72) Inventors: Gozde Sahinoglu, Laguna Hills, CA (US); Vincent Yves Francois Roussel, Irvine, CA (US); Siukai Mak, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 16/287,988

(22) Filed: Feb. 27, 2019

(65) Prior Publication Data

US 2020/0274587 A1 Aug. 27, 2020

(51) Int. Cl.
*H04B 7/06* (2006.01)
*H04B 7/0408* (2017.01)
*H04B 1/713* (2011.01)

(52) U.S. Cl.
CPC ........... *H04B 7/0615* (2013.01); *H04B 1/713* (2013.01); *H04B 7/0408* (2013.01)

(58) Field of Classification Search
CPC ..... H04B 1/713; H04B 7/0408; H04B 7/0615
See application file for complete search history.

(56) References Cited

U.S. PATENT DOCUMENTS

| | | | |
|---|---|---|---|
| 2006/0148482 A1* | 7/2006 | Mangold | H04W 16/14 455/450 |
| 2006/0280116 A1* | 12/2006 | Ji | H01Q 3/26 370/210 |
| 2007/0249404 A1* | 10/2007 | Gao | H01Q 3/2605 455/562.1 |

* cited by examiner

*Primary Examiner* — David B Lugo
(74) *Attorney, Agent, or Firm* — Morgan, Lewis & Bockius LLP

(57) ABSTRACT

A binning-based transmit beamforming for wireless communication systems includes determining a time correlation and a frequency correlation of a beamforming vector estimated from a previous transmission on a current hopping channel and one or more neighboring channels using one or more binning architectures that exploit channel correlation in both frequency and time dimensions. These binning architectures include global binning, local binning, and adaptive version of global and local binning. The subject system determines one or more beamforming weights for the current hoping channel according to the binning architecture, and provides, for transmission, a signal using transmit beamforming based on the one or more beamforming weights.

27 Claims, 14 Drawing Sheets

BINNING-BASED TRANSMIT BEAMFORMING FOR WIRELESS COMMUNICATION SYSTEMS

TECHNICAL FIELD

The present disclosure relates generally to wireless communication devices, and in particular, to binning-based transmit beamforming for wireless communication systems.

BACKGROUND

In wireless communications, such as Bluetooth, each connection event starts with a master device transmitting and a slave device receiving. Then, it continues with the slave device transmitting and the master device receiving. Due to this standardized transmit-receive order for the master and slave devices, transmit (Tx) beamforming is hampered by the difficulty of obtaining an up-to-date beamforming vector at the master device. In particular, the master device can estimate the beamforming vector while receiving a packet with a known preamble from the slave device. Since the master device transmits first and subsequently receives, the most recent beamforming vector is not available at the master device during a Tx beamforming in a transmit time slot. In fact, the most recent estimate of the beamforming vector is available at the master device in the following receive time slot when Tx beamforming is completed.

BRIEF DESCRIPTION OF THE DRAWINGS

Certain features of the subject technology are set forth in the appended claims. However, for purpose of explanation, several embodiments of the subject technology are set forth in the following figures.

Certain features of the subject technology are set forth in the appended claims. However, for purpose of explanation, one or more implementations of the subject technology are set forth in the following figures.

DETAILED DESCRIPTION

Figure 1:
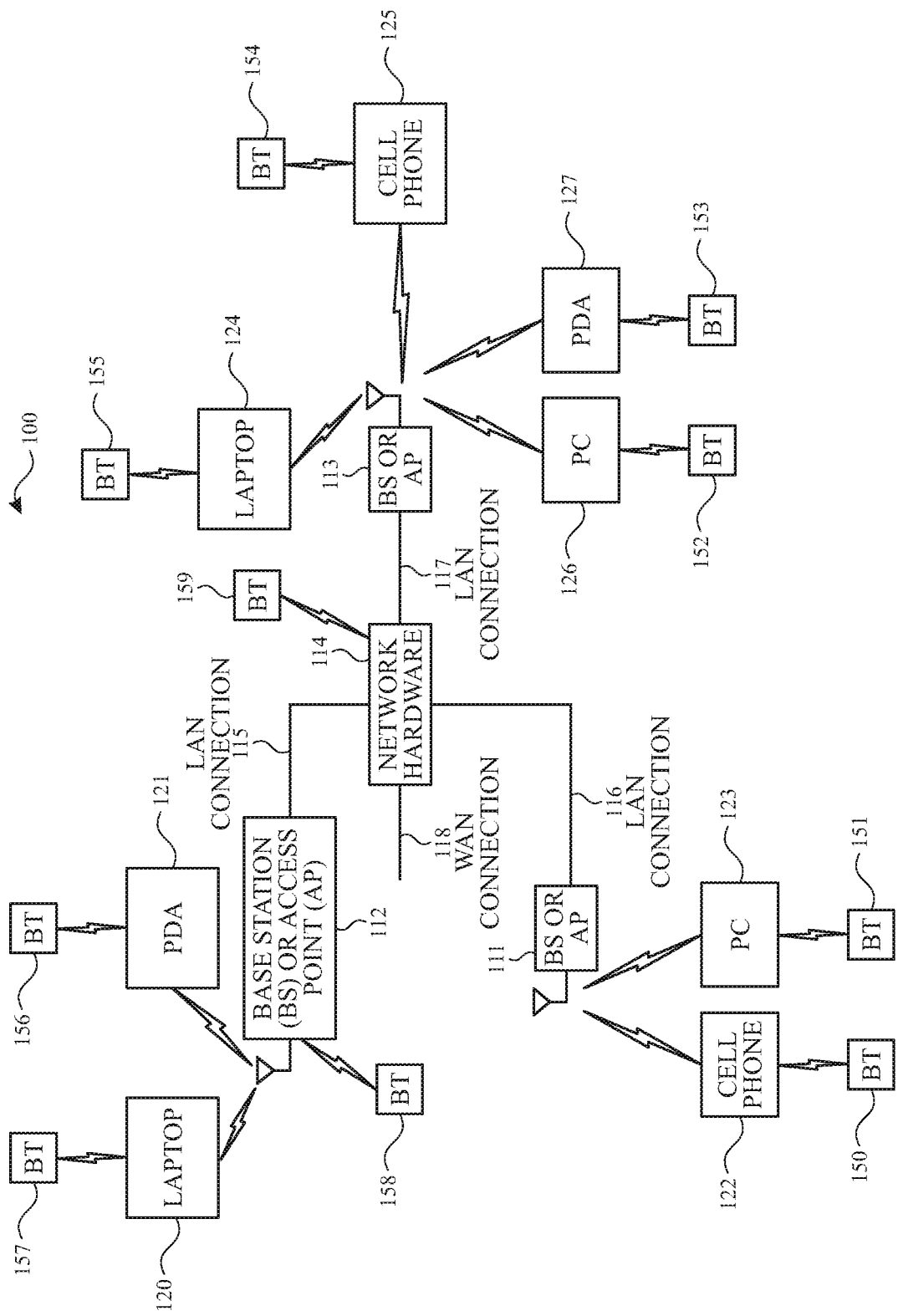
FIG. 1 is a diagram illustrating wireless communication system in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In one traditional approach to Tx beamforming, a receiver estimates a beamforming vector and sends it back to a transmitter. However, this approach incurs high communication overhead. In another traditional approach, a transmitter assumes channel reciprocity and uses received preambles from a receiver to calculate beamforming weights on the same channel. In still another approach, a transmitter applies a most recent beamforming vector by reusing the beamforming weights estimated from a last reception on a same hopping channel. However, the channel coherence time, in which the channel is considered to be not varying, is inherently a limiting factor to use previously estimated beamforming vectors on a current hopping channel. For example, Bluetooth is a frequency-hopping-based system. If the return time to the same hopping channel is greater than the channel coherence time, a previous estimate of the beamforming vector is likely to be outdated for purposes of being used on the current hopping channel. Using outdated beamforming weights can cause major performance degradation with respect to the case of applying the most recent beamforming vector.

In Bluetooth, the master device always transmits first before receiving a packet from the slave device. The master device cannot receive a training sequence/preamble from the slave device on the current hopping channel to estimate the beamforming vector before starting transmit beamforming. Therefore, the traditional approaches discussed above are not directly applicable for the master device to obtain most recent beamforming vector estimate prior to beamforming.

The subject technology provides for exploiting time correlation and frequency correlation of beamforming vectors estimated from a previous transmission on a current hopping channel and its neighboring channels in order to infer the beamforming weights for the current hoping channel.

Neighboring channels have a similar beamforming vector due to the channel coherence bandwidth. As a result, grouping nearby channels into bins and utilizing the most recent estimate of the beamforming vector in a bin reduces age of the beamforming weights to be used by transmit beamforming.

In binning, the number channels to be grouped into bins is determined by a bin-width parameter. Channels belonging to the same bin use the same estimate of the beamforming vector. A beamforming vector in each bin is updated when a new beamforming vector estimate is obtained from any of the channels belonging to the same bin. Thus, binning exploits channel correlation in both frequency and time dimensions.

In some implementations, the subject technology includes global binning, local binning, and adaptive version of global and local binning. In global binning, consecutive channels are grouped into bins, and hence, bins do not share common channels. In local binning, bins are formed locally around a center specified by each channel, such that overlapping channels exist across bins. In the adaptive versions, an optimal bin-width can be determined with respect to changing channel conditions by maximizing penalty and reward-based objective functions, which are adaptively calculated when a new beamforming vector estimate is available.

In some implementations, the subject technology includes an iterative version of the adaptive binning, which provides lower computational complexity. In the iterative version, as a new beamforming vector estimate is available, correlation values of beamforming vectors in time and frequency dimensions can be computed iteratively based on a previous correlation value instead of computing a correlation matrix in its entirety.

In some implementations, the subject technology includes fixed binning, which can be used where an exhaustive search is performed to choose a bin-width that minimizes the packet error rate (PER). In some aspects, the bin-width selection is performed offline for a given channel profile and the selected bin-width is fixed during operation.

The subject technology provides beamforming gain in terms of increased received SNR, improved error rate performance, and reduced number of transmissions for any wireless device using Bluetooth with multiple antennas over a single antenna system.

FIG. 1 is a diagram illustrating wireless communication system 100 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The wireless communication system 100 includes base stations (BS) and/or access points (AP) 111-113 (an AP may be a personal control point), wireless communication devices 120-127 and a network hardware component 114. The wireless communication devices 120-127 include laptop computers 120 and 124, personal digital assistants 121 and 127, personal computers 123 and 126, cellular telephones 122 and 125, and/or any other type of device that supports wireless communications.

The base stations or access points 111-113 are operably coupled to network hardware 114 via respective local area network (LAN) connections 115-117. Network hardware 114, which may be a router, switch, bridge, modem, system controller, may provide a wide area network (WAN) connection 118 for the wireless communication system 100. Base stations or access points 111-113 have an associated antenna or antenna array to individually communicate with wireless communication devices in its area. The wireless communication devices register with a particular base station or access point 111-113 to receive services within the wireless communication system 100. For direct connections (e.g., point-to-point communications), the wireless communication devices may communicate directly via an allocated channel.

Base stations can be used for cellular telephone systems (including LTE and 5G systems) and like-type systems, while access points may be used for in-home or in-building wireless networks. Regardless of the particular type of communication system, each wireless communication device may include a built-in radio and/or is coupled to a radio. The radio includes a linear amplifier and/or programmable multi-stage amplifier to enhance performance, reduce costs, reduce size, and/or enhance broadband applications. The radio also may include, or is coupled to, an antenna or an array of antennas having a particular antenna coverage pattern for propagation of outbound radio frequency (RF) signals and/or reception of inbound RF signals. In some aspects, the array of antennas may be directional antennas (e.g., beamforming).

According to some implementations, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), enhanced data rates for GSM evolution (EDGE), general packet radio service (GPRS), high-speed downlink packet access (HSDPA), high-speed uplink packet access (HSDPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

One or more of the shown devices may include circuitry and/or software that allows the particular device to communicate using Bluetooth (BT) communication system technology with each other or with proximal BT devices 150-159. The range of communication using BT is shorter than typical wide local area network (WLAN) links. A BT communication link may utilize various versions of a BT specification, including the Bluetooth Core Specification Version 4.0, Volume 6 (Low Energy Controller Volume) that pertains to Bluetooth™ Low Energy (BLE). Although BLE may operate in conjunction with classical BT, BLE does have a functional difference in the application of the protocol for establishing a communication link between two or more BLE compatible devices.

Figure 2:
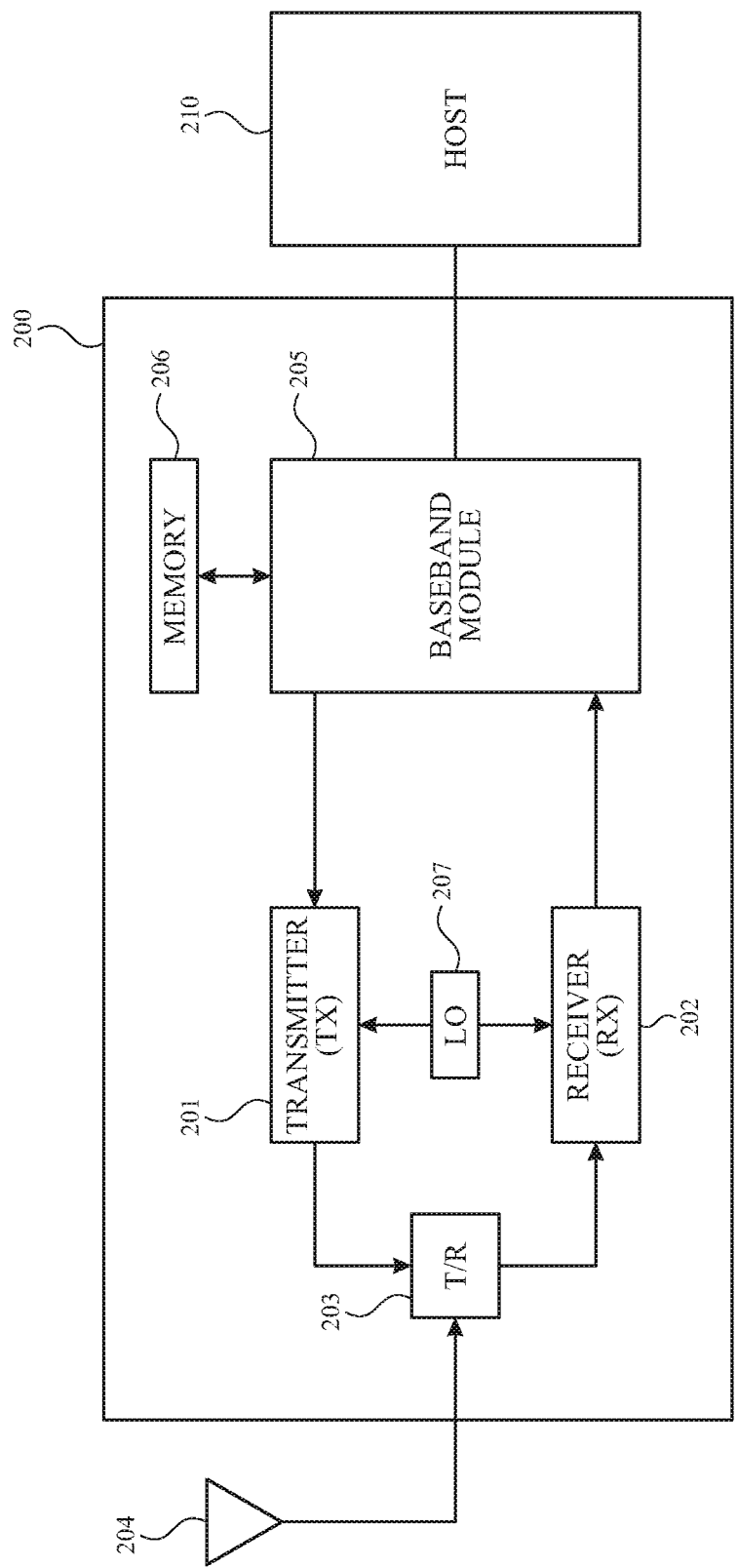
FIG. 2 is a diagram illustrating a wireless communication device that includes a host device and associated radio.

FIG. 2 illustrates a schematic block diagram of a wireless communication portion 200 of a wireless device according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The wireless communication portion 200 includes a transmitter (TX) 201, a receiver (RX) 202, a local oscillator (LO) 207 and a baseband module 205. Baseband module 205 may be configured to provide baseband processing operations. In some implementations, baseband module 205 includes a digital signal processor (DSP). The baseband module 205 is coupled to a host unit (e.g., host 210), an applications processor or other unit(s) that provides Bluetooth operational processing for the device and/or interface with a user.

As shown in FIG. 2, a host 210 is provided. The host 210 may represent a host module of a Bluetooth device, while the wireless communication portion 200 is utilized to provide the radio (e.g. RF front end) and baseband functions. The radio portion of the wireless communication portion 200 may be implemented to support one or more Bluetooth modes, or may include other wireless systems such as WLAN (e.g. WiFi) and/or cellular or satellite communications. Any or all of the hardware shown in FIG. 2 may be incorporated in one or more of the wireless communication devices shown in FIG. 1.

The memory 206 is coupled to the baseband module 205. The memory 206 may be utilized to store data including program instructions that operate on the baseband module 205. Various types of memory devices may be utilized for memory 206. The memory 206 may be located anywhere within the wireless communication portion 200.

The transmitter 201 and receiver 202 are coupled to an antenna 204 via transmit/receive (T/R) switch module 203. The T/R switch module 203 is configured to switch the antenna between the transmitter and receiver depending on the mode of operation. In some aspects, separate antennas are used for transmitter 201 and receiver 202. In some implementations, multiple antennas or antenna arrays are utilized with the wireless communication portion 200 to provide antenna diversity or multiple input and/or multiple output (MIMO) capabilities.

For frequencies in a gigahertz range (e.g., 2.4 GHz to 5 GHz), omni-directional antennas may provide appropriate coverage for communicating between wireless devices. However, at higher frequencies, directional antennas with beamforming capabilities are utilized to direct the beam to concentrate the transmitted energy, due to the limited range of the signal. In these instances, antenna arrays allow for directing the beam in a particular direction or target. Beamforming allows a pair of stations (STAs) or an access point (AP) and a STA to train and orient their directional antennas for obtaining an optimal wireless connection to communicate with each other. Beamforming is established after the two devices follow through a successful training sequence as noted above. One feature of beamforming is beam refinement. Beam refinement is a process where an STA may improve its antenna configuration (or antenna weight and vector) for transmission and/or reception.

Outbound data for transmission from the host 210 is forwarded to the baseband module 205 and converted into baseband signals, and then upconverted for transmission via the transmitter 201. For example, the transmitter 201 converts the baseband signals to outbound radio frequency (RF) signals for transmission from the wireless communication portion 200 via antenna 204. The transmitter 201 may utilize one of a variety of up-conversion or modulation techniques to convert the outbound baseband signals to outbound RF signal. The conversion process is dependent on the particular communication standard or protocol being utilized.

In a similar manner, inbound RF signals are received by the antenna 204 and coupled to the receiver 202. The receiver 202 then converts the inbound RF signals into inbound baseband signals, which are then coupled to baseband module 205. The receiver 202 may utilize one of a variety of down-conversion or demodulation techniques to convert the inbound RF signals into inbound baseband signals. The inbound baseband signals are processed by the baseband module 205 and inbound data is output from baseband module 205 to the host 210.

The LO 207 provides local oscillation signals to the transmitter 201 for up-conversion and to the receiver 202 for down-conversion. In some aspects, separate LO signals may be used for the transmitter 201 and the receiver 202. Although a variety of LO circuitry may be used, in some implementations, a phase-locked loop (PLL) is utilized to lock the LO to output a frequency-stable LO signal based on a selected channel frequency.

The baseband module 205, the LO 207, the transmitter 201 and the receiver 202 may be integrated on a same integrated circuit (IC) chip. The transmitter 201 and receiver 202 can sometimes be referred to as RF front-end modules (or components) or radios. In some aspects, one or more of the aforementioned components may be on separate IC chips. Similarly, other components shown in FIG. 2 may be incorporated into the same IC chip, along with the baseband module 205, the LO 207, the transmitter 201 and the receiver 202. In some aspects, the antenna 204 is incorporated into the same IC chip. With the advent of system-on-chip (SOC) integration, host devices, application processors and/or user interfaces, such as the host 210, may be integrated into the same IC chip along with the baseband module 205, the transmitter 201 and the receiver 202.

Any of the various embodiments of the wireless communication portion 200 that may be implemented within various communication systems can incorporate functionality to perform communication via more than one standard, protocol, or other predetermined means of communication. For example, the wireless communication portion 200 implemented as a single communication device, can include functionality to perform communication in accordance with a first protocol, a second protocol, and/or a third protocol. These various protocols may be WiMAX (Worldwide Interoperability for Microwave Access) protocol, a protocol that complies with a wireless local area network (e.g., WLAN/WiFi) (e.g., one of the IEEE (Institute of Electrical and Electronics Engineer) 802.11 protocols such as 802.11a, 802.11b, 802.11g, 802.11n, 802.11ac or 802.11ax), a Bluetooth protocol, or any other predetermined means by which wireless communication may be effectuated.

Figure 3:
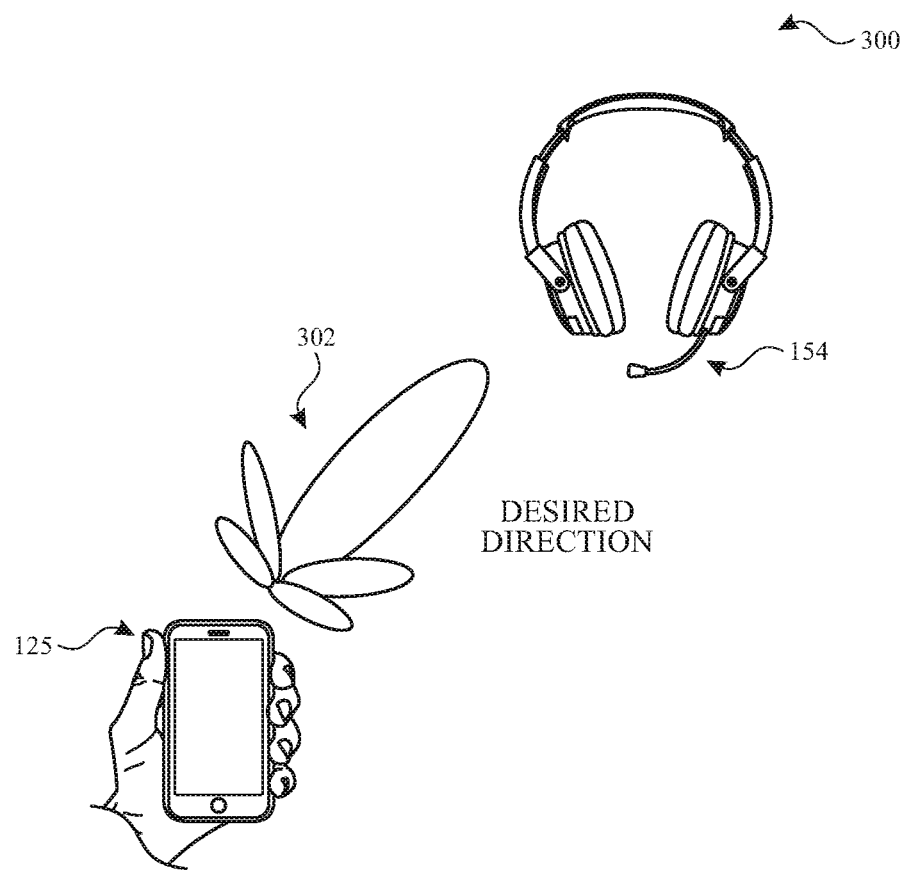
FIG. 3 conceptually illustrates an example of a communication environment utilizing transmit beamforming according to one or more implementations of the subject technology.

FIG. 3 conceptually illustrates an example of a communication environment 300 utilizing transmit beamforming according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In some aspects, a dual-core BT chip (or integrated circuit) provides beamforming/combining capabilities that are utilized to direct a beam to concentrate the transmitted energy. As depicted in FIG. 3, when wireless communication devices, such as the cellular telephone 125 and the BT device 154 communicate in the communication environment 300, a directed beam 302 is directed by the cellular telephone 125 toward the BT device 154. In some aspects, the BT device 154 may be a wireless headset. The illustration of FIG. 3 shows a plurality of directed energy lobes emanating from the cellular telephone 125, in which one lobe is larger than the other to indicate the directed energy in a particular orientation. Note that with a typical beamforming procedure, the particular device (e.g., 125) operates by having a plurality of propagation sectors. When the optimal sector is detected or determined, the device orients the antenna (or antenna array) to operate in the optimal sector. Generally, training sequences are used to determine the optimal direction for orienting the antenna. Accordingly, in FIG. 3, the larger lobe represents the orienting of the directional antennas for a first wireless device to communicate with a second wireless device optimally.

Transmit beamforming can enhance the system performance by exploiting multiple antennas at the transmitter to create spatial diversity, and hence, reduce the impact of channel fading. In transmit beamforming, the same signal is sent from each transmit antenna, but the phase of each signal is adjusted in such a way that the phases are added constructively at the receiver. Hence, the signal-to-noise ratio (SNR) value at the receiving end is increased (or maximized). In this respect, an improved SNR decreases the number of packet errors. Consequently, an improved error rate performance reduces the amount of retransmissions. This in turn leads to an improved bandwidth utilization. In some aspects, no change is needed in the BT packet format to perform the transmit beamforming.

Figure 4:
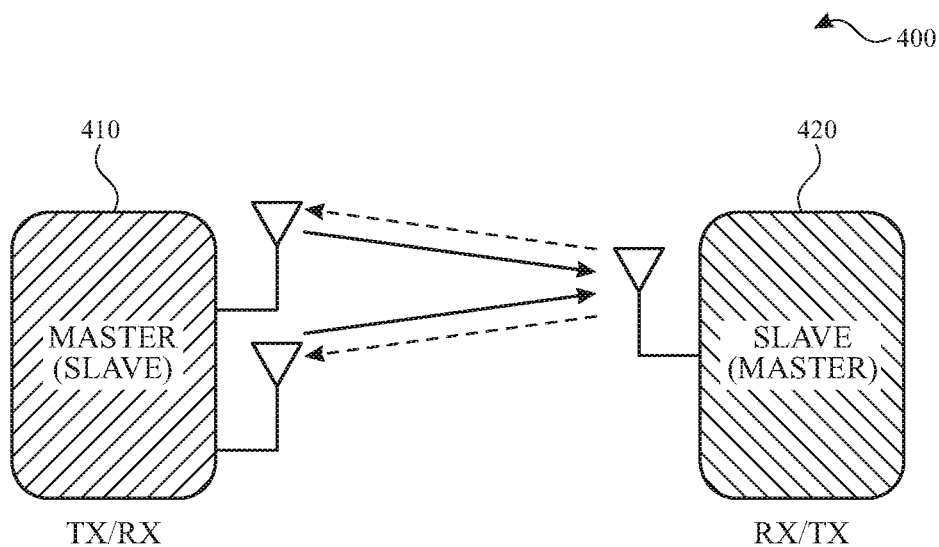
FIG. 4 illustrates an example of a Bluetooth communication system according to one or more implementations of the subject technology.

FIG. 4 illustrates an example of a Bluetooth communication system 400 according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The Bluetooth communication system 400 includes a master device 410 and a slave device 420. The Bluetooth communication system 400 may be operable to utilize a frequency division multiple access (FDMA) scheme and a time division multiple access (TDMA) scheme to support vice and/or data communication. In some implementations, the Bluetooth communication system 400 may be enabled to utilize a TDMA based polling scheme in link layer communications between the master device 410 and the slave device 420. In this regard, the TDMA based polling scheme involves one device (e.g., master device 250) transmitting a packet at a predetermined time and a corresponding device (e.g., slave device 260) responding with a packet after a predetermined time.

As depicted in FIG. 4, the master device 410 includes multiple antennas or an antenna arrays to provide create spatial diversity over the communication channel with the slave device 420. For example, the master device 410 can send a same signal from each transmit antenna, in which the phase of each signal is adjusted in such a way that the phases are added constructively at the slave device 420. Within a connection event, the master and slave devices alternate sending data packets using the same data channel. In some implementations, the master device 410 initiates the beginning of each connection event and can end each connection event at any time.

In some implementations, the master device 410 includes a maximal ratio combining (MRC) module (not shown) in a receiver circuit of the master device 410 for facilitating receiver diversity in a wireless link. During reception of a packet, the MRC module estimates relative phase between two antennas. Then at a transmitter of the master device 410, this relative phase estimate is used to adjust the phase of signals from each antenna such that they add constructively at the receiver (e.g., at the slave device 420). In this respect, the received signal after beamforming may be expressed as:

$$y(k)=h_1x(k)+h_2e^{j(\Theta_1-\Theta_2)}x(k)+n$$

$$=(|h_1|+|h_2|)e^{j\Theta_1}x(k)+n$$

where $h_1=|h_2|=|h_1|e^{j\Theta_1}$, $h_2=|h_2|e^{j\Theta_2}$, $\Theta_1-\Theta_2$=relative phase between two antennas.

Figure 5A:
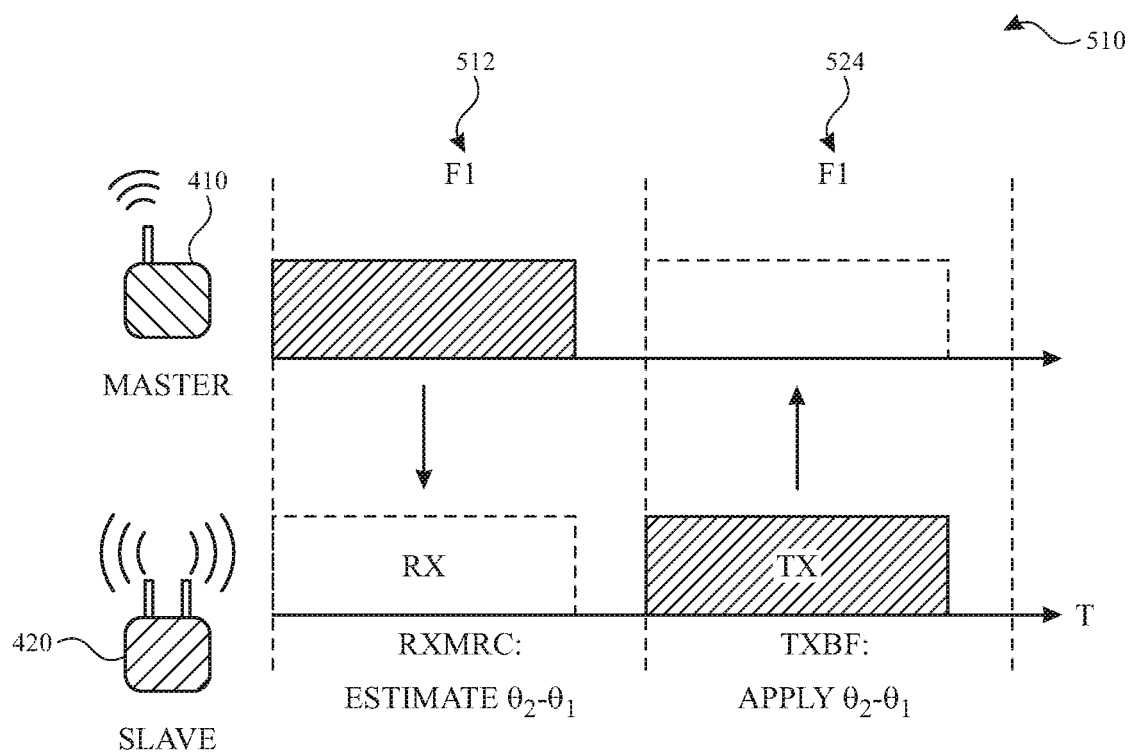
FIGS. 5A and 5B illustrate examples of a frame exchange between a master device and a slave device according to one or more implementations of the subject technology.
Figure 5B:
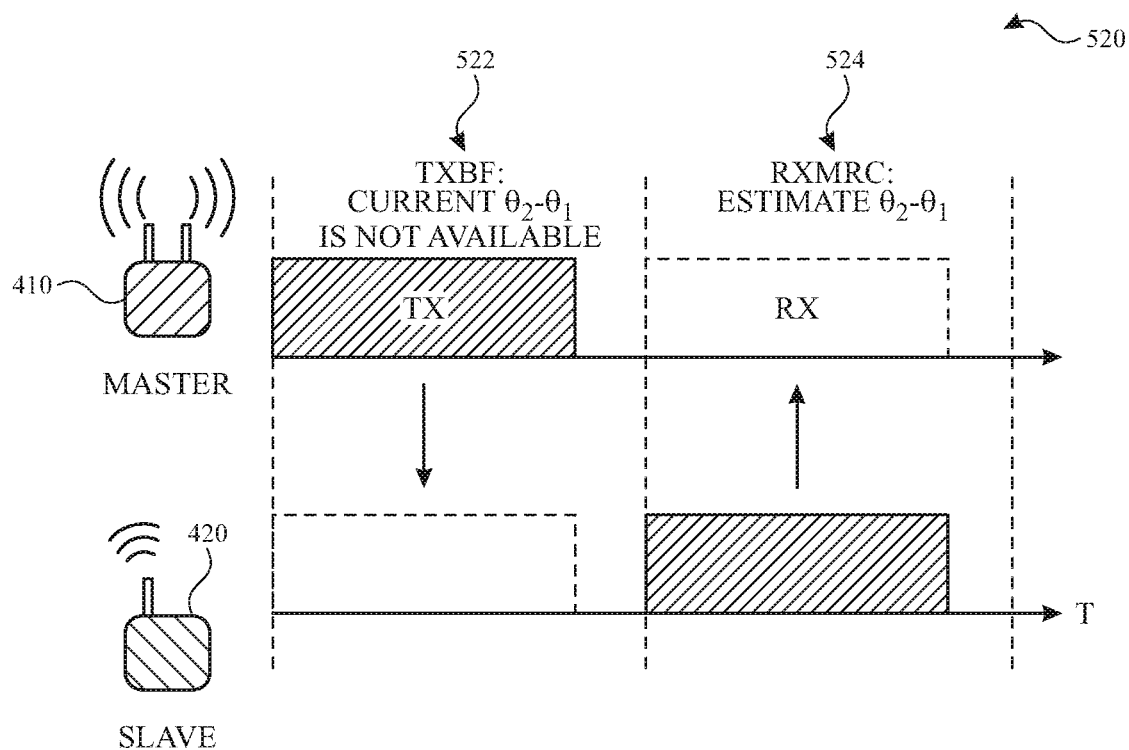

FIGS. 5A and 5B illustrate examples of a frame exchange between a master device and a slave device according to one or more implementations of the subject technology. During a connection event, data packets may be transmitted with inter-frame spacing and at least one data packet may originate from a master such as the master device 410 in the connection event. The master device 410 may transmit the first data packet in each connection event to an intended slave such as the slave device 420. In this regard, the slave device 420 may transmit a response after a predetermined time (e.g., 514), which can then be followed by another master transmit (not shown). The master device 410 may be operable to utilize a TDMA based polling scheme to poll the intended slave for packet transmission in each connection event. The master device 410 may be enabled to determine packet payload size for data packets and packet transmission timing in each connection event.

The slave device 420 may be associated with one or more link layer connections with the master device 410. The slave device 420 may be enabled to synchronize with connection event start points, called anchor points from a slave device's perspective, for data communication with the master device 410. The slave device 420 may consider that a link layer connection setup with the master device 410 may be complete after receiving a connection request packet from the master device 410. The slave device 420 may be operable to transmit data packets in the data channel after receiving a packet from the master device 410 in associated link layer connection.

In FIG. 5A, a first frame exchange 510 includes a master device (e.g., 410) with a single antenna transmitting first to a slave device (e.g., 420) in a first time slot 512. In this respect, the slave device 420, having multiple antennas, receives first and transmits second. Hence, the slave device 420 can obtain a phase estimate during reception and then apply beamforming immediately in a subsequent time-slot 514. For example, the MRC module of the slave device 420 can calculate the phase estimate (e.g., $\theta_2-\theta_1$) in the time slot 512, and apply the phase estimate $\theta_2-\theta_1$ for the transmit beamforming via the multiple antennas to the master device 410. The frame exchange of FIG. 5A represents an optimal use case where the minimum lag is between estimating and applying beamforming coefficients.

In FIG. 5B, a second frame exchange 520 includes the master device 410 with multiple antennas transmitting first to the slave device 420 in a first time slot 522. However, the master device 410 transmits first before receiving, and therefore, a current phase estimate is not available for Tx beamforming. In this respect, the master device 410 needs to use phase estimates from previous packets. In a second time slot 524, the MRC module of the master device 410 can calculate the phase estimate (e.g., $\theta_2-\theta_1$) after reception from the slave device 420 in the time slot 524. The frame exchange of FIG. 5B represents a challenging use case where previous phase estimates are likely to be outdated due to hopping and channel variations.

Figure 6A:
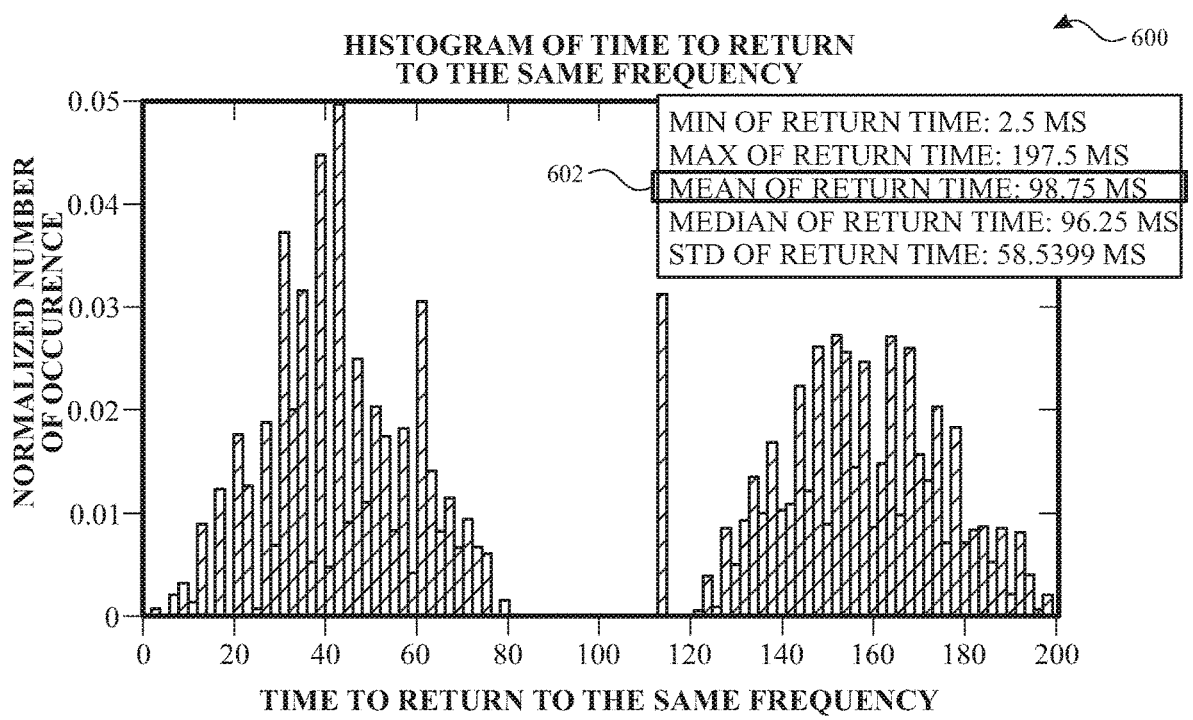
FIG. 6A illustrates a plot of an example histogram depicting the time for a signal to return to a same frequency according to one or more implementations of the subject technology.

FIG. 6A illustrates a plot of an example histogram 600 depicting the time for a signal to return to a same frequency according to one or more implementations of the subject technology. Channel coherence bandwidth is a statistical measure of range of frequencies for which signals are highly correlated. Neighboring frequencies have similar phase due to the channel coherence bandwidth. In FIG. 6A, the channel coherence time ($T_c$) can be expressed as:

$$T_c = 9/(16 * \pi * f_d), \quad \text{Eq. (1)}$$

where Doppler frequency ($f_d$) is 3 Hz, which can result in a channel coherence time of 60 ms. When the return time to the same frequency is greater than the channel coherence time, the last phase estimate of a current hopping frequency is likely to be outdated. This may cause a significant performance difference with respect to a case scenario having knowledge of an ideal phase value. As illustrated in FIG. 6A, the mean return time is about 98.75 ms, whereas the channel coherence time is about 60 ms, which likely suggests the current hopping frequency is outdated in this case given that the mean return time is greater than the channel coherence time.

Figure 6B:
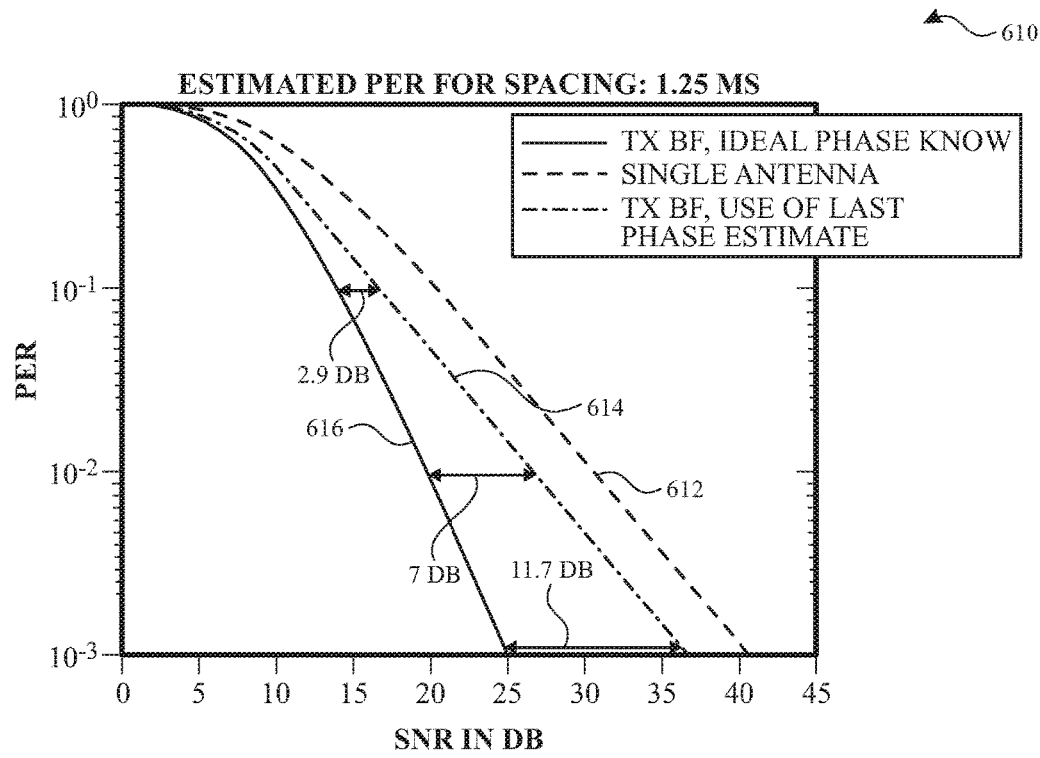
FIG. 6B illustrates a plot of example curves representing packet error rates of different transmission signals using single and multiple antennas according to one or more implementations of the subject technology.

FIG. 6B illustrates a plot of example curves representing packet error rates of different transmission signals using single and multiple antennas. A first curve 612 represents a transmission signal using a single antenna, a second curve 614 represents a transmission signal using transmit beamforming based on a last phase estimate, and a third curve 616 represents a transmission signal using transmit beamforming based on the ideal phase estimate being known. The second curve 614 provides improved SNR measurements compared to the first curve 612, however, the second curve 614 still lags behind the third curve 616. The SNR gap between the second curve 614 and the third curve 616 widens as PER increases (e.g., 2.9 dB at PER $10^{-1}$, 7 dB at PER $10^{-2}$, and 11.7 dB at PER $10^{-3}$).

Figure 7A:
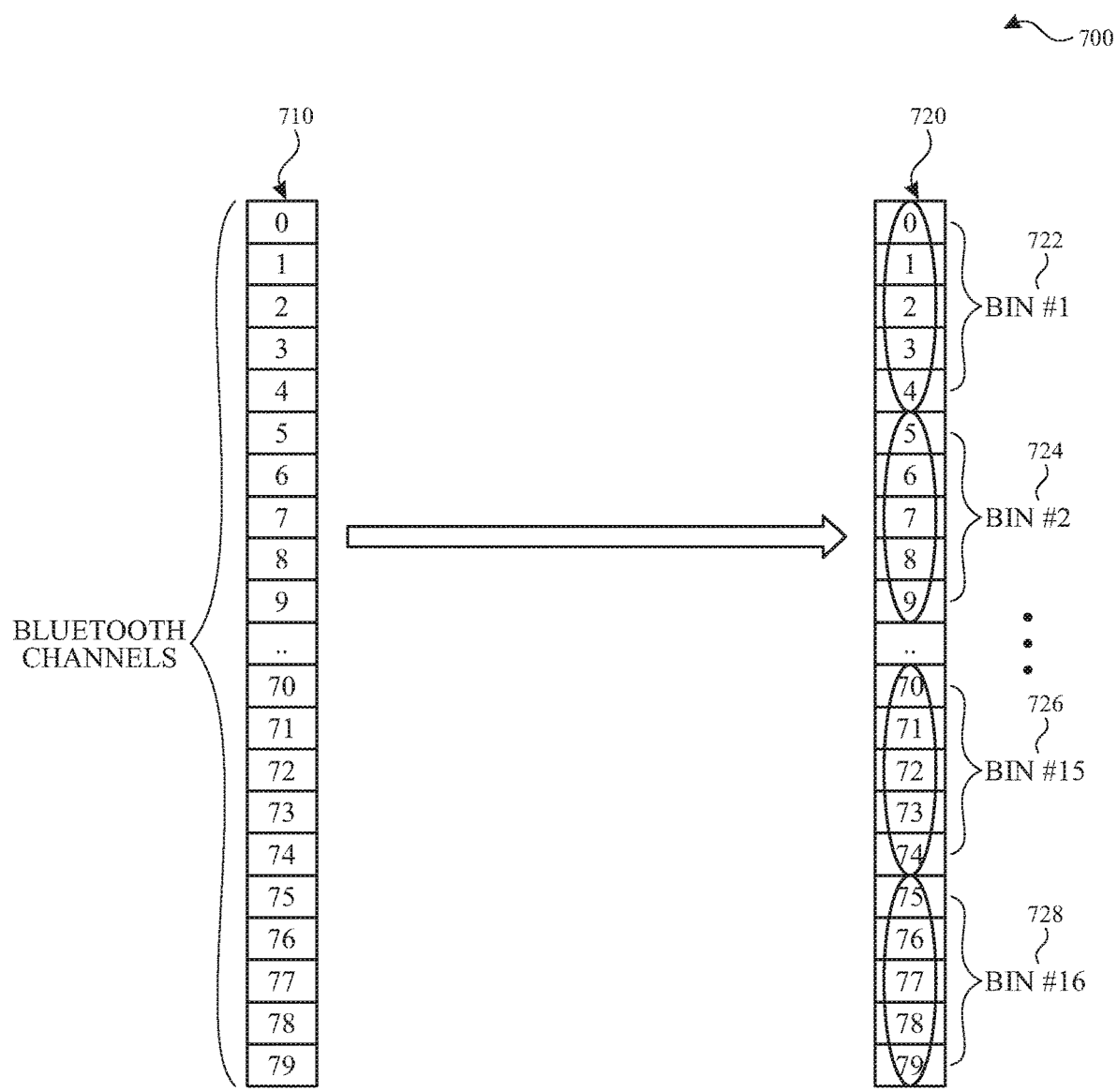
FIG. 7A conceptually illustrates an example of a global binning framework according to one or more implementations of the subject technology.

FIG. 7A conceptually illustrates an example of a global binning framework 700 according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

A Bluetooth communication system, such as the wireless communication portion 200 of FIG. 2, may be operable to utilize a frequency division multiple access (FDMA) scheme and a time division multiple access (TDMA) scheme to support voice and/or data communications. The Bluetooth communication system may be configured to operate on 80 non-overlapping channels, spaced 1 MHz apart per the FDMA scheme. As depicted in FIG. 7A, the global binning framework 700 includes an allocation of Bluetooth channels 710 (e.g., enumerated from 0 to 79). The allocation of Bluetooth channels 710 are divided into groups referred to as "bins" to form a bin allocation 720. The bin allocation 720 includes a first bin 722 (denoted as "Bin #1"), a second bin 724 (denoted as "Bin #2"), a fifteenth bin 726 (denoted as "Bin #15") and a sixteenth bin 728 (denoted as "Bin #16"). The total number of bins may be 16 for 5 MHz bin-width in the global binning framework 700.

In the global binning framework 700, consecutive channels are grouped into bins, and hence, the bins do not share common channels. For example, the first bin 722 includes channels 0-4, whereas the second bin 724 includes channels 5-9. The consecutive channels are grouped into bins with intervals determined by the bin-width. For example, each of the bins includes 5 channels based on a given bin-width of 5 MHz, where each channel has an interval spacing of 1 Mhz. As a result, for a bin-width of 5 MHz, five (5) consecutive channels can be placed into a same bin (i.e., channels 0, 1, 2, 3, 4 are in the first bin 722, channels 5, 6, 7, 8, 9 are in the second bin 724, and so on.). In this respect, channels belonging to the same bin use the same phase estimate for the Tx beamforming. In some implementations, the phase estimate in a bin is updated whenever a new phase estimate from any of the channels in the same bin is obtained.

However, the channels located on edges of the bins (e.g., channels 0 and 4 for the first bin 722, channels 5 and 9 for the second bin 724, etc.) do not fully utilize the phase estimate of their neighboring channels since upper/lower halves of the neighboring channels are belonging to the adjacent bins (i.e., a different bin). For example, when the current hopping frequency corresponds to channel 4, the latest phase estimate is from channel 0. However, the phase estimate of the second bin 724 is more up-to-date than the phase estimate of the first bin 722, where the latest phase estimate originates from channel 5.

Figure 7B:
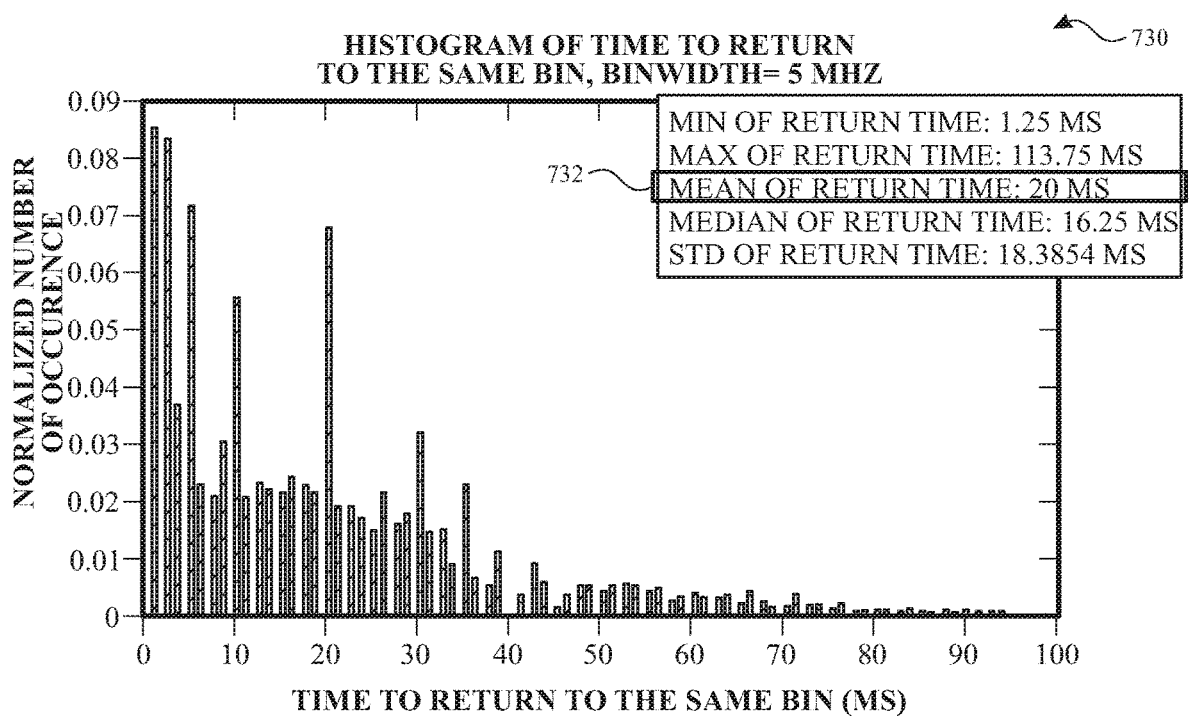
FIG. 7B illustrates a plot of an example histogram depicting the time for a signal to return to a same frequency based on global binning according to one or more implementations of the subject technology.

FIG. 7B illustrates a plot of an example histogram 730 depicting the time for a signal to return to a same frequency based on global binning according to one or more implementations of the subject technology. As illustrated in FIG. 7B, the mean return time is about 20.0 ms, whereas the channel coherence time is about 60 ms, which likely suggests the current hopping frequency is up-to-date in this case. In comparison to the plot illustrated in FIG. 6B, the mean return time depicted in FIG. 7B is significantly less than the mean return time depicted in FIG. 6B, thereby illustrating the performance benefit of using global binning for transmit beamforming.

Figure 7C:
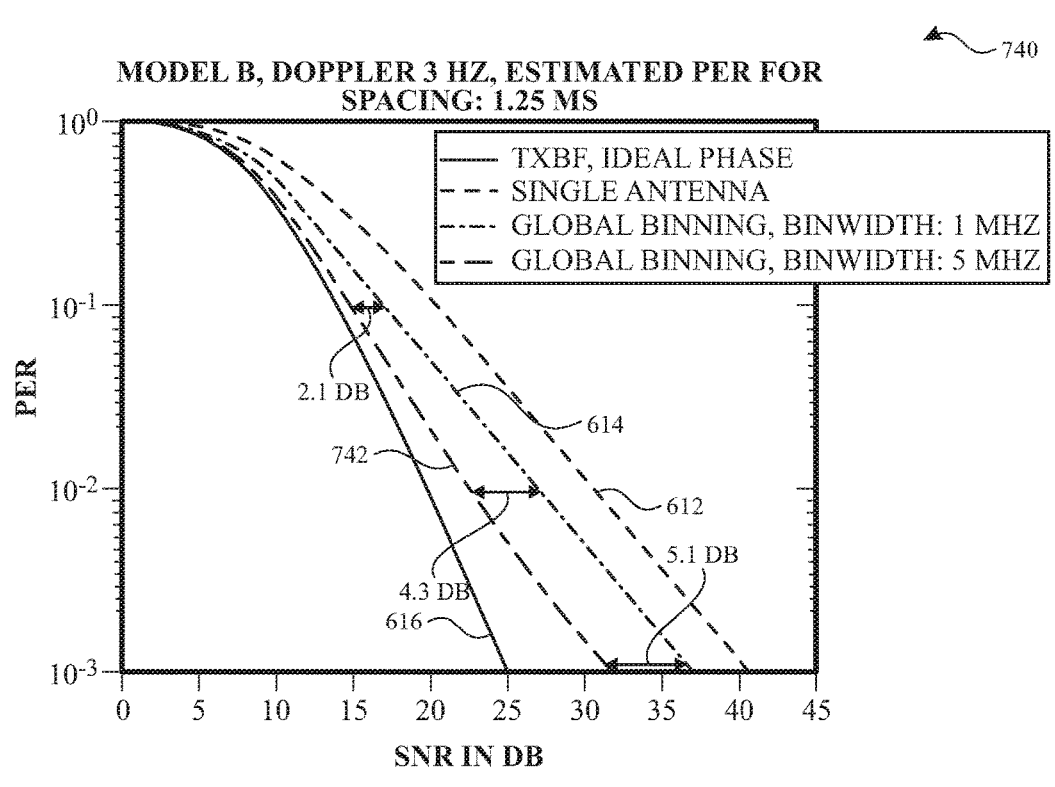
FIG. 7C illustrates a plot of example curves representing packet error rates of different transmission signals using single and multiple antennas based on global binning according to one or more implementations of the subject technology.

FIG. 7C illustrates a plot 740 of example curves representing packet error rates of different transmission signals using single and multiple antennas based on global binning according to one or more implementations of the subject technology. The first curve 612 represents a transmission signal using a single antenna, the second curve 614 represents a transmission signal using transmit beamforming based on global binning with a 1 MHz bin-width, the third curve 616 represents a transmission signal using transmit beamforming based on the ideal phase estimate being known, and a fourth curve 742 represents a transmission signal using transmit beamforming based on global binning with a 5 MHz bin-width. The second curve 614 provides improved SNR measurements compared to the first curve 612, however, the second curve 614 still lags behind the third curve 616. The SNR gap between the second curve 614 and the fourth curve 742 widens as PER increases (e.g., 2.1 dB at PER $10^{-1}$, 4.3 dB at PER $10^{-2}$, and 5.1 dB at PER $10^{-3}$). In this respect, the fourth curve 742 provides improved SNR measurements compared to the second curve 614 by closing the gap to the third curve 616.

As depicted in FIGS. 7B and 7C, grouping nearby hopping frequencies into bins and utilizing the most recent phase estimate in the bin reduces age of the phase to be used by Tx beamforming.

Figure 8A:
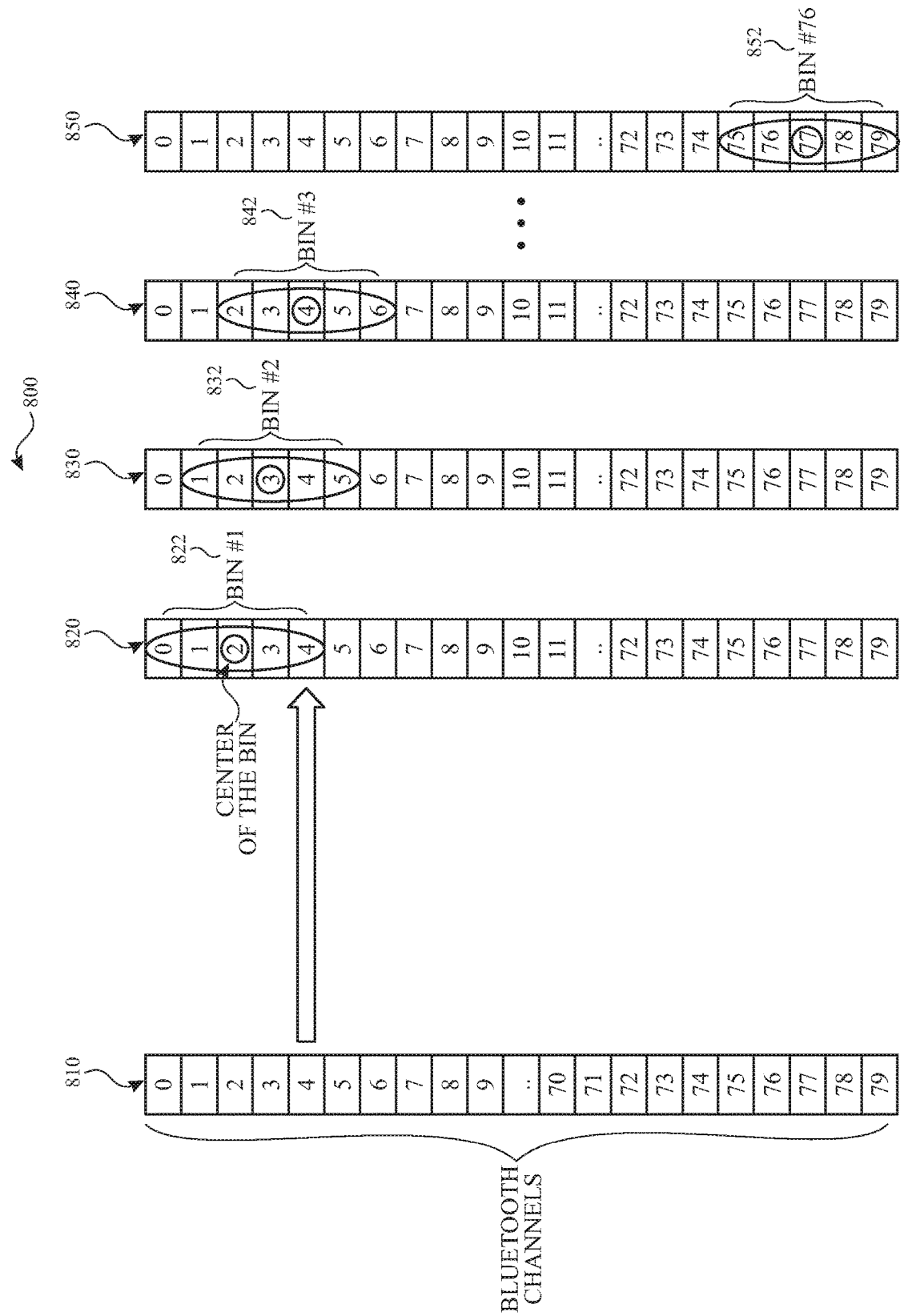
FIG. 8A conceptually illustrates an example of a local binning framework according to one or more implementations of the subject technology.

FIG. 8A conceptually illustrates an example of a local binning framework 800 according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

Unlike the global binning framework 700, bins have overlapping channels in the local binning framework 800. As depicted in FIG. 8A, the local binning framework 800 includes an allocation of Bluetooth channels 810 (e.g., enumerated from 0 to 79). The allocation of Bluetooth channels 810 are divided into groups referred to as "bins" to form multiple bin allocations (e.g., 820, 830, 840, 850). The bin allocation 820 includes a first bin 822 (denoted as "Bin #1"), the bin allocation 830 includes a second bin 832 (denoted as "Bin #2"), the bin allocation 840 includes a third bin 842 (denoted as "Bin #3") and the bin allocation 850 includes a seventy-sixth bin 852 (denoted as "Bin #76").

In the local binning framework 800, bins are formed locally around a center specified by each channel. For example, when a bin-width is 5 MHz, the first bin 722 contains channel 2 as a bin center as well as its neighbor channels ±1 MHz and ±2 MHz apart from channel 2 (i.e., channels 1, 3 and channels 0, 4, respectively). Similarly, the second bin 724 includes channel 3 as a bin center along with its adjacent channels 1, 2, 4, and 5. The total number of bins is 76 for 5 MHz bin-width in local binning. In this respect, channel 2 uses the phase estimate in the first bin 722, where it is a center frequency of that bin. In a similar fashion, channel 3 uses the phase estimate in the second bin 724, where it is a center frequency of that bin.

Unlike global binning, the channel can be belonging to multiple bins in local binning. For instance, the first bin 722 and the second bin 724 have four channels in common, i.e., channels 1, 2, 3, and 4. Based on the bin formation structure in which bins are formed locally around the channel of interest, the local binning framework 800 can utilize the frequency correlation of the beamforming vectors of the neighboring channels more efficiently than the global binning framework 700.

Figure 8B:
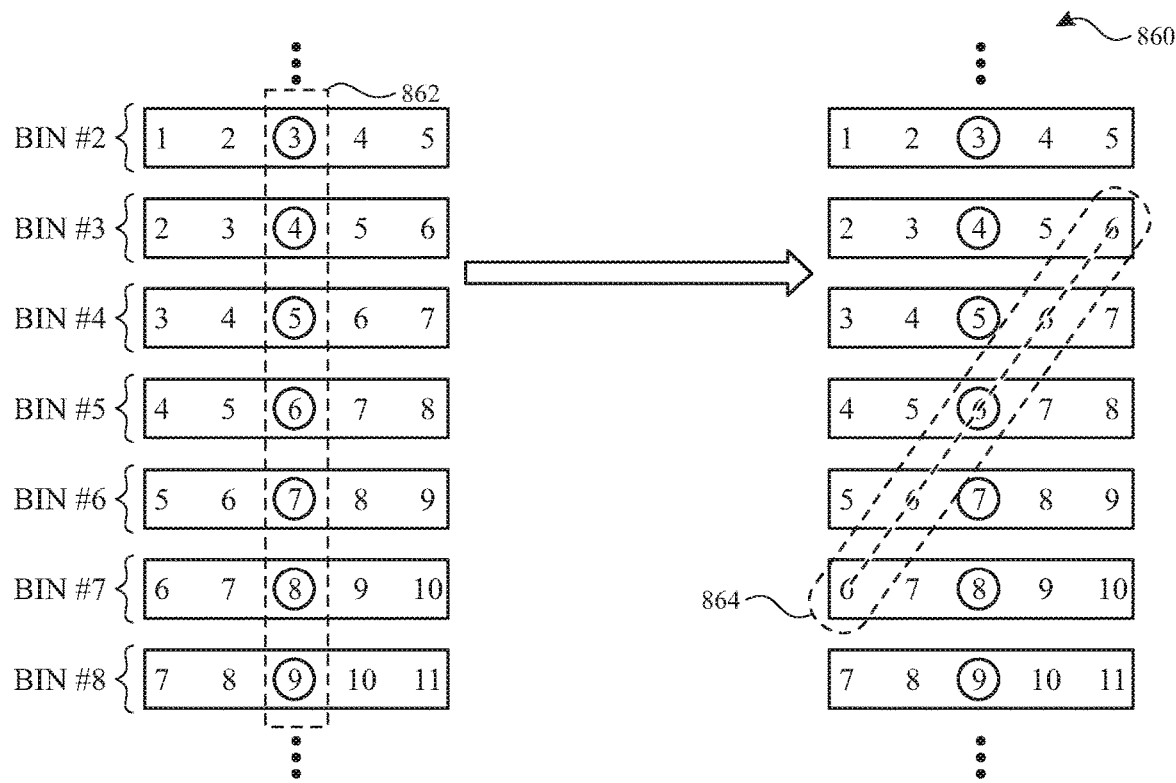
FIG. 8B conceptually illustrates an example of a phase estimate update for the local binning framework according to one or more implementations of the subject technology.

FIG. 8B conceptually illustrates an example of a phase estimate update 860 for the local binning framework 800 according to one or more implementations of the subject technology. In some implementations, the phase estimate in a bin is updated whenever a new phase estimate from any of the channels in the same bin is obtained. As depicted in FIG. 8B, where a new phase estimate of channel 6 is assumed available, phase estimates in a bin centered at channel 6 (e.g., among bin centers 862) and neighboring bins that contain channel 6 (e.g., 864) are updated.

In some implementations, a bin update rule is given as follows:
1) Find the bin (denoted by $B_c$) centered at the channel that has a new phase estimate.
2) Update the phase estimate in bins $$\left\{ B_c, B_c \pm 1, B_c \pm \left\lfloor \frac{\text{Bin width}}{2} \right\rfloor \right\}$$

with new phase information.

Figure 8C:
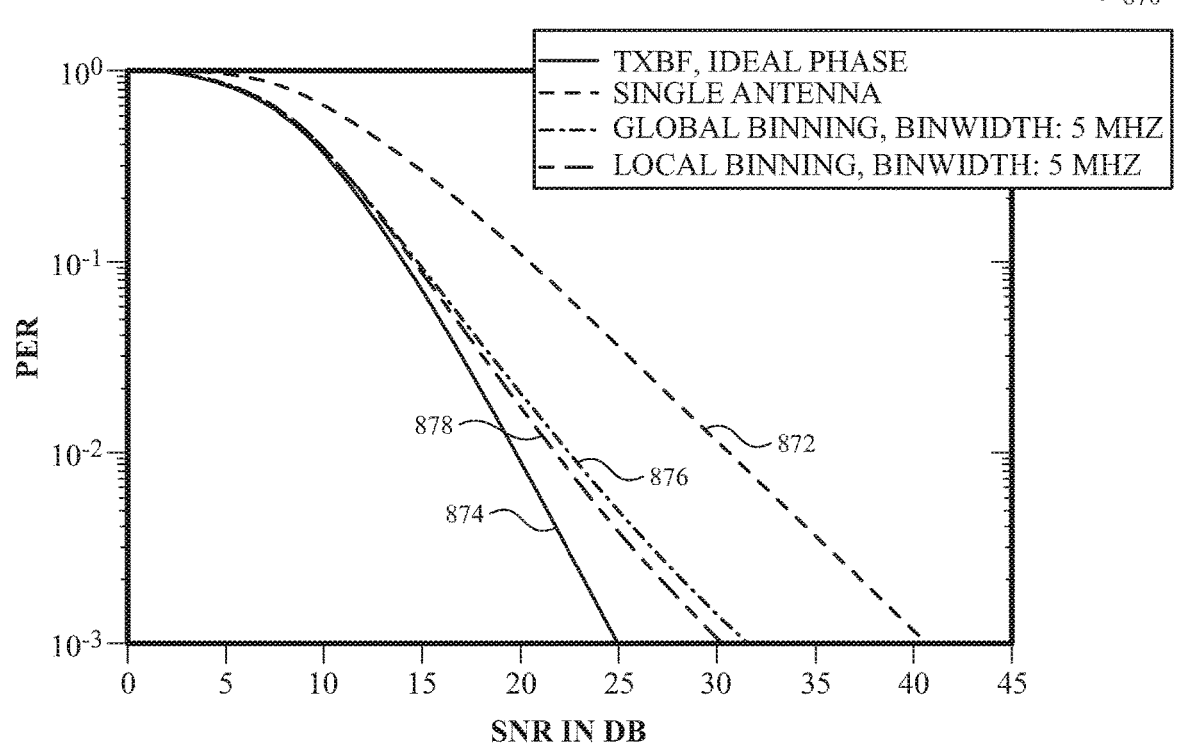
FIG. 8C illustrates a plot of example curves representing packet error rates of different transmission signals using single and multiple antennas based on local binning according to one or more implementations of the subject technology.

FIG. 8C illustrates a plot 870 of example curves representing packet error rates of different transmission signals using single and multiple antennas based on local binning according to one or more implementations of the subject technology. The plot 870 includes first curve 872 that represents a transmission signal using a single antenna, a second curve 874 that represents a transmission signal using transmit beamforming based on the ideal phase estimate being known, a third curve 876 that represents a transmission signal using transmit beamforming based on global binning with a 5 MHz bin-width, and a fourth curve 878 that represents a transmission signal using transmit beamforming based on local binning with a 5 MHz bin-width. The third curve 876 provides improved PER measurements compared to the first curve 872, however, the third curve 876 still lags behind the fourth curve 878. As depicted in FIG. 8C, the local binning results in higher SNR improvement (i.e., up to 1.27 dB) with respect to global binning.

Figure 9A:
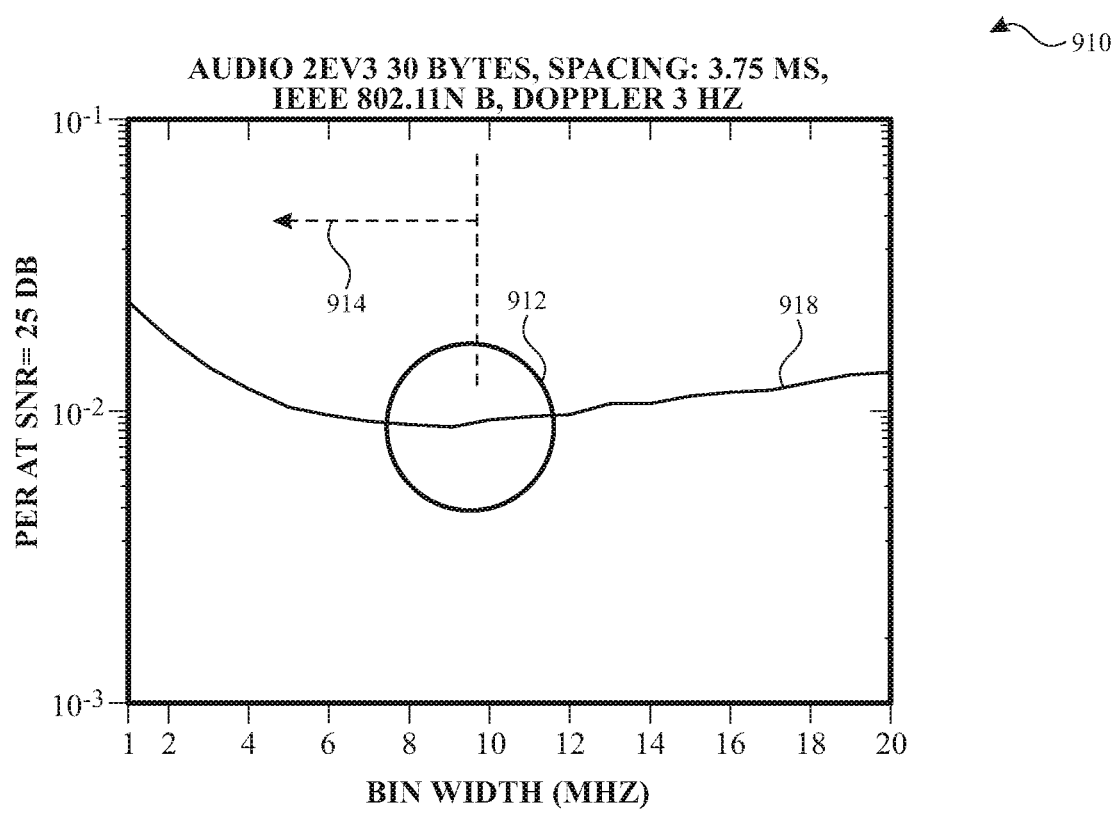
FIGS. 9A and 9B illustrate plots depicting examples of packet error rates for different bin widths according to one or more implementations of the subject technology.
Figure 9B:
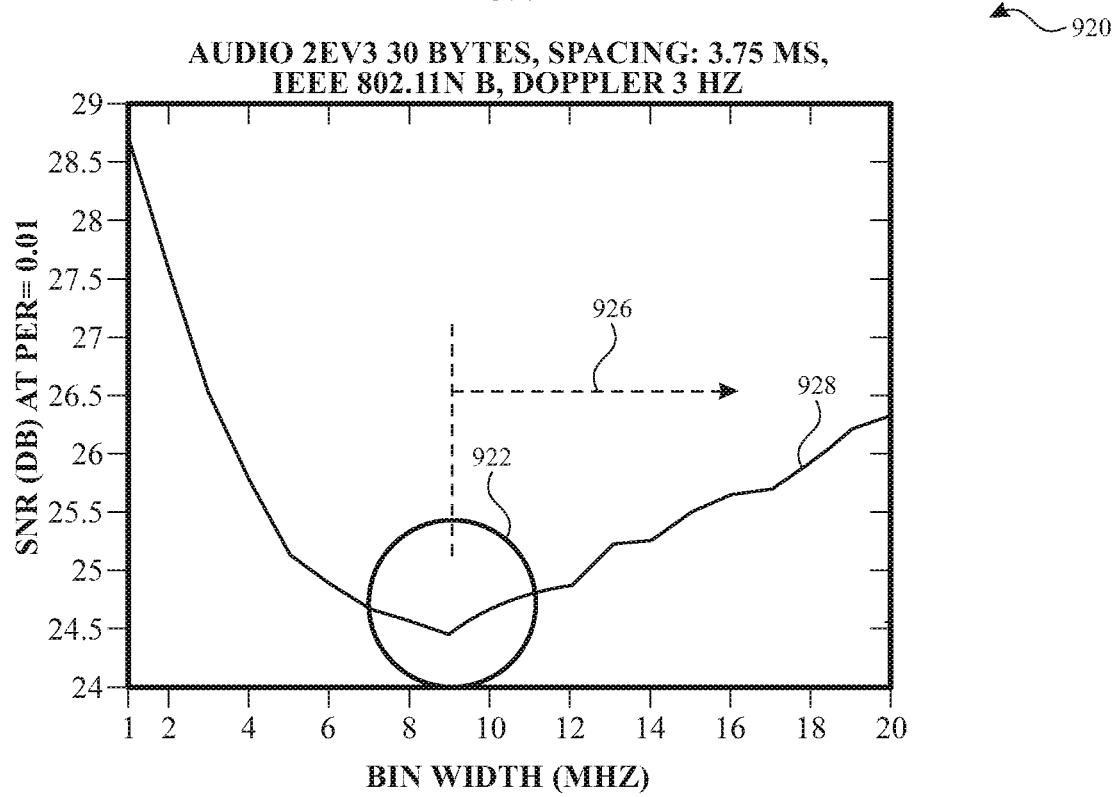

FIGS. 9A and 9B illustrate plots depicting examples of packet error rates for different bin widths according to one or more implementations of the subject technology. In FIG. 9A, a plot 910 includes a curve 918 representing the packet error rate at a given SNR for a given bin-width, where the Doppler frequency is 3 Hz and spacing is set to 3.75 ms. In the plot 910, an optimal bin-width exists within a region 912 of the curve 918, where the packet error rate is minimal. In some aspects, the optimal bin-width may be in a range of 8 MHz to 11 MHz for a case where the SNR is about 25 dB. If the bin-width is decreased from the optimal bin-width range (e.g., 914), the packet error rate performance degrades because the mean time return to a bin increases. Hence, it is more likely for the phase of the bin to be outdated due to a time-varying channel.

In FIG. 9B, a plot 920 includes a curve 928 representing the SNR at a given packet error rate for a given bin-width, where the Doppler frequency is 3 Hz and spacing is set to 3.75 ms. In the plot 920, an optimal bin-width exists within a region 922 of the curve 928, where the SNR is minimal. In some aspects, the optimal bin-width may be in a range of 8 MHz to 11 MHz for a case where the packet error rate is about 0.01 (or $10^{-2}$). If the bin-width is increased from the optimal bin-width range (e.g., 926), the packet error rate performance deteriorates because as the bin-width increases, a bin contains additional frequencies and their average frequency correlation decreases due to the channel coherence bandwidth.

Figure 10:
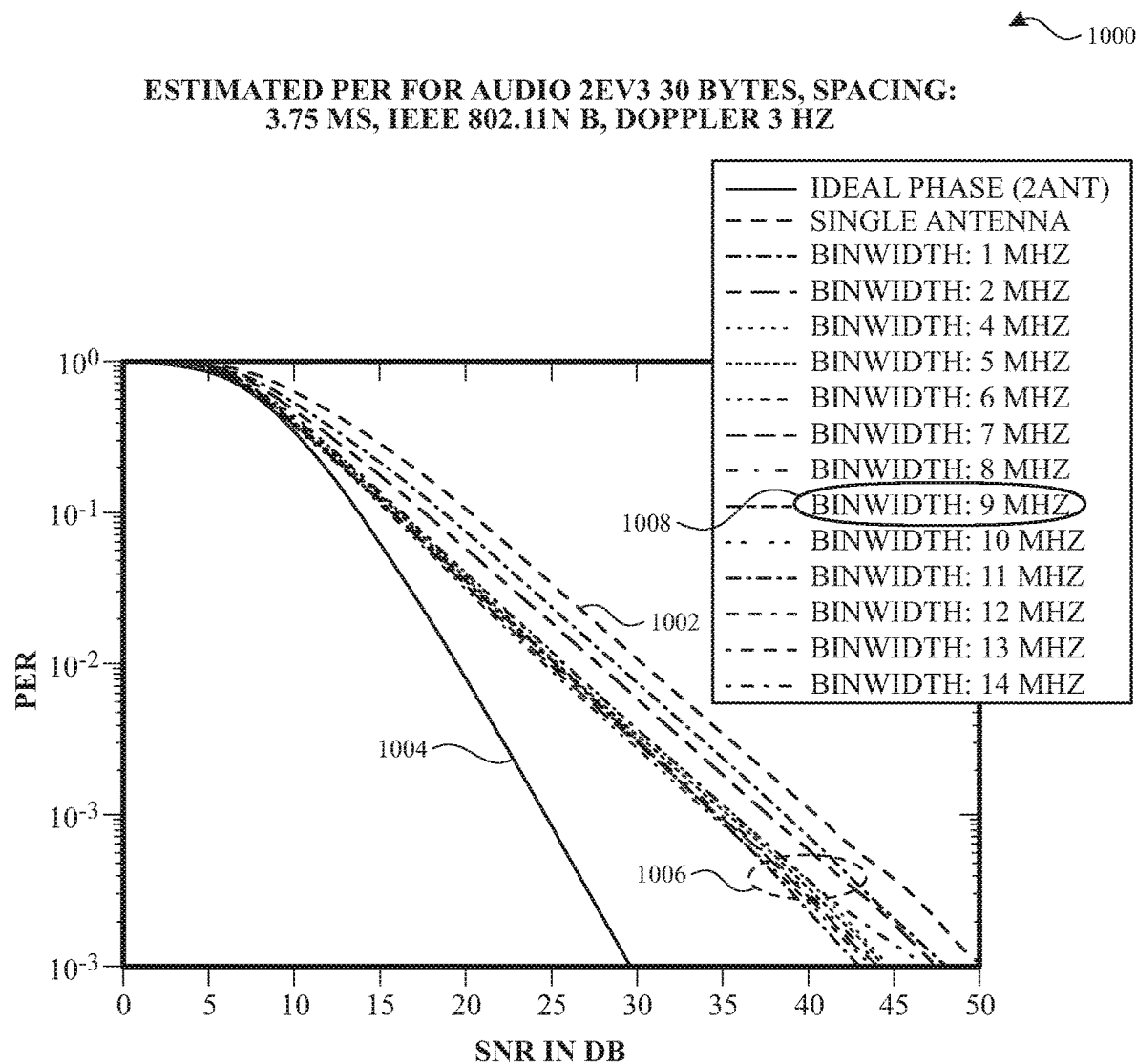
FIG. 10 illustrates a plot of example curves representing different packet error rates of transmission signals having different bin widths according to one or more implementations of the subject technology.

FIG. 10 illustrates a plot 1000 of example curves representing different packet error rates of transmission signals having different bin widths according to one or more implementations of the subject technology. The plot 1000 includes a first curve 10002 that represents a transmission signal using a single antenna, a second curve 1004 that represents a transmission signal using transmit beamforming based on the ideal phase estimate being known, and a bundle of curves 1006 that respectively represent different transmission signals with varying predetermined bin widths. In some implementations, an exhaustive search can be performed over the bundle of bin widths such that the bin width that minimizes the packet error rate is selected and used during TX beamforming as a predetermined bin-width. As depicted in FIG. 10, the bin-width 1008 (denoted as "9 MHz binwidth") is selected through the exhaustive search and applied to a binning framework, such as global binning (see FIGS. 7A-7C) or local binning (see FIGS. 8A-8C).

In some implementations, the selection of the predetermined bin-width is completed manually and offline through an exhaustive search, whereby it would not be applicable to real-time operation. In some aspects, the offline process of determining the bin-width through the exhaustive search may not be adaptive to changing channel conditions and/or packet spacing variations.

Figure 11A:
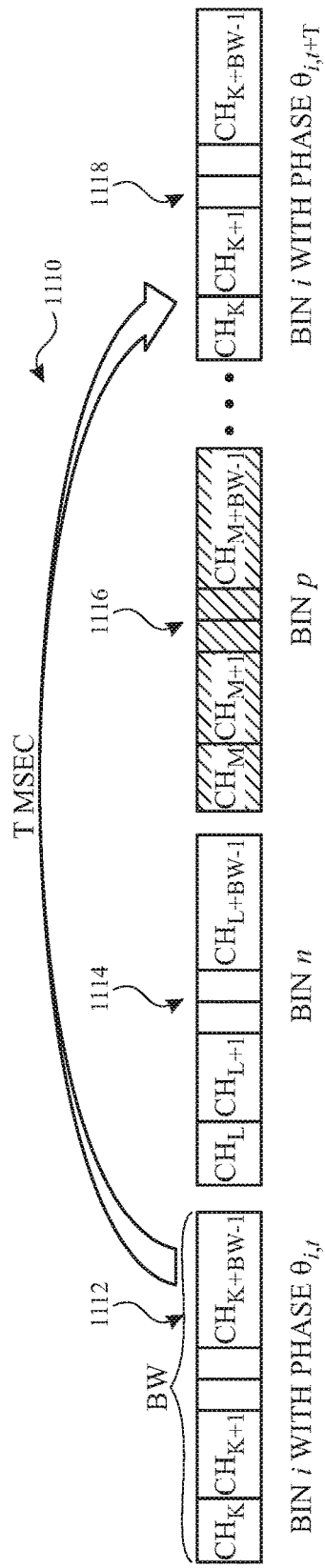
FIG. 11A conceptually illustrates an example of an adaptive binning framework according to one or more implementations of the subject technology.

FIG. 11A conceptually illustrates an example of an adaptive binning framework 1110 according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

It is important to determine the optimal value of bin-width such that both time and frequency correlation among the channels in a bin are fully utilized, and hence, the best performance is obtained. If the bin-width is chosen too large, frequency correlation of the channels in a bin becomes lower. On the other hand, if small values of bin-width are chosen, the total number of bins is increased and it takes more time to return back to the same bin due to the increasing number of bins. As a result, beamforming weights to be used by transmit beamforming become more outdated.

The optimal value of the bin-width depends on channel conditions since channel coherence time and channel coherence bandwidth directly affects correlation among the channels grouped into the same bin. In a first approach to determine the optimal bin-width, simulations are executed offline for a set of bin-width values under a given channel condition and the bin-width that minimizes packet error rates would be selected. In a second approach to determine the optimal bin-width, bin-width values are adaptively found with respect to changing channel conditions as illustrated in FIG. 11A. In particular, an optimal bin-width is found by maximizing a penalty-and-reward-based objective function, which is adaptively calculated when a new estimate of beamforming vector is available.

In FIG. 11A, the adaptive binning framework 1110 includes a first bin 1112, a second bin 1114, a third bin 1116, and a fourth bin 1118. The first bin 1112 corresponds to Bin i with phase $\theta_{(i,t)}$. The second bin 1114 corresponds to Bin n, and the third bin 1116 corresponds to Bin p. The fourth bin 1118 corresponds to Bin i with phase $\theta_{(i,t+T)}$. As depicted in FIG. 11A, the first bin 1112 is the same bin as the fourth bin 1118 (i.e., returned after a predetermined return time).

In some implementations, having highly correlated phase values $\theta_{(i,t)}$ and $\theta_{(i,t+T)}$ in a bin for the channels $\{ch_k, ch_{k+1}, \ldots, ch_{k+BW-1}\}$ when a return occurs to the same bin after T msec provides an improvement in transmit beamforming performance. In this respect, determining the optimal bin width for the best use of time and frequency correlation of phase values in a bin is desirable.

The adaptive binning framework 1110 may utilize adaptive global binning to select a bin width that maximizes correlation of phase values averaged over a number of channels in both time and frequency dimensions. The binwidth optimization can be formulated as follows:

$$BW_{opt} = \arg\max_{\substack{BW_i \in \{1,2,3,\ldots\} \\ \text{given } t_p, N_{ch}}} R_{avg}(BW_i, t_p) \qquad \text{Eq. (2)}$$

$$= \arg\max_{\substack{BW_i \\ \text{given } t_p, N_{ch}}} \frac{1}{N_{ch}} \sum_{i=1}^{N_{bin}} R_{avg,i}(BW_i, t_p), \qquad \text{Eq. (3)}$$

Where the term $R_{avg,i}(\cdot)$ is the average correlation of phase values for a given bin width (e.g., $i^{th}$ bin), the term $\Delta t$ corresponds to packet spacing, the term $N_{ch}$ corresponds to the total number of channels in adaptive frequency hopping (AFH), the term $N_{bin}$ corresponds to the total number of bins, the term $BW_i$ corresponds to the bin width of $i^{th}$ bin, the term $BW_{opt}$ corresponds to the optimal bin-width, and the term $t_p$ corresponds to the Bluetooth packet spacing.

In some aspects, the average correlation per bin, $R_{avg,i}(BW_i, t_p)$, can be calculated as follows:

$$R_{avg,i}(BW_i, t_p) = BW_i \times H(BW_i, t_p, \Delta f = 0) + \qquad \text{Eq. (4)}$$
$$2 \sum_{\Delta f'=1}^{BW_i - 1} ((BW_i - \Delta f') H(BW_i, t_p, \Delta f = \Delta f'))$$

In equation (4), the term $H(BW_{b,i}, \Delta f, \Delta t)$, can be expressed as follows:

$$H(BW_i, t_p, \Delta f) = \sum_{k=1}^{N_h} (1 - BW_i p)^{k-1} p |R_f(\Delta f)| |R_t(\Delta t = kt_p)| \qquad \text{Eq. (5)}$$

Where $$p = \frac{1}{N_{ch}}$$

and $N_h$ corresponds to the total number of hops.

In some aspects, the frequency correlation function can be calculated as follows:

$$R_f(\Delta f) = E\{C_N(f,t) C_N^*(f - \Delta f, t - tp)\} \qquad \text{Eq. (6)}$$

In some aspects, the time correlation function can be calculated as follows:

$$R_t(\Delta t) = E\{C_N(f,t) C_N^*(f, t - \Delta t)\} \qquad \text{Eq. (7)}$$

Where $C_N$ (f,t) denotes the normalized cross-spectrum between two channels, which is expressed as follows:

$$C_N(f, t) = \frac{H_1(f, t)H_2^*(f, t)}{|H_1(f, t)H_2^*(f, t)|} \quad \text{Eq. (8)}$$

Where $H_1$ (f,t) is a complex channel frequency response of channel 1, and $H_2$ (f,t) is a complex channel frequency response of channel 2.

Figure 11B:
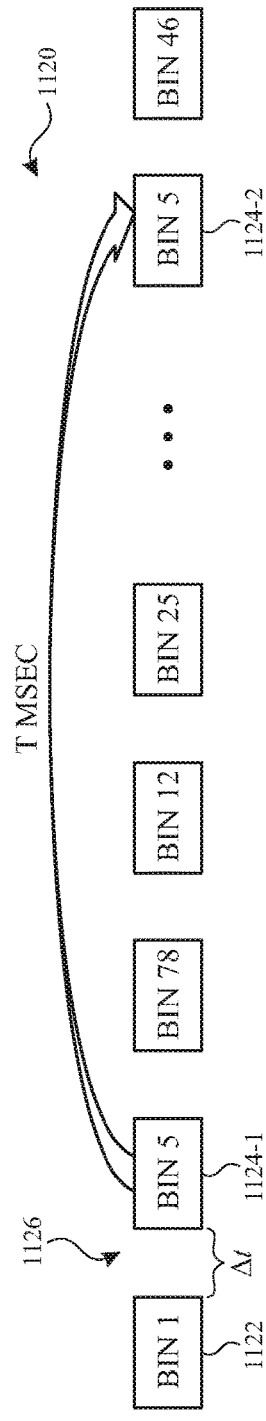
FIG. 11B conceptually illustrates an example of an adaptive binning framework having a first predetermined bin width according to one or more implementations of the subject technology.

FIG. 11B conceptually illustrates an example of an adaptive global binning framework 1120 having a first predetermined bin width according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In FIG. 11B, the adaptive global binning framework 1120 includes a first bin 1122, a second bin 1124-1, and a third bin 1124-2. In some aspects, the first bin 1122 and the second bin 1124-1 are spaced apart by a predetermined time difference 1126 denoted as Δt. As depicted in FIG. 11B, the second bin 1124-1 is the same bin as the third bin 1124-2 (i.e., returned after a predetermined return time). In the illustrated example of FIG. 11B, the first predetermined bin width is assumed to equal 1 MHz, in which each bin contains one channel. In this respect, the term $R_{avg,i}(BW_i=1, t_p)$ can be calculated as follows:

$$R_{avg,i}(BW_i = 1, t_p, \Delta f) = \quad \text{Eq. (9)}$$

$$\begin{cases} |R_{f,t}(\Delta f = 0, \Delta t = t_p)| \approx & \\ |R_f(\Delta f = 0)||R_t(\Delta t = t_p)| & \text{with probability } p \\ |R_f(\Delta f = 0)||R_t(\Delta t = 2t_p)| & \text{with prob. } (1-p) \\ |R_f(\Delta f = 0)||R_t(\Delta t = 3t_p)| & \text{with prob. } (1-p)^2 p \\ \vdots & \\ |R_f(\Delta f = 0)||R_t(\Delta t = N_h t_p)| & \text{with prob. } (1-p)^{N_h-1} p \end{cases}$$

Where $p=1/N_{ch}$. In equation (9), the correlation of phase values is computed for each channel when returning to its bin. In this computation, both time and frequency domain correlations are assumed independent.

In some implementations, the term $R_{avg,i}(BW_i=1, t_p)$ is calculated by taking expectation of $R_i(BW_i=1, t_p, \Delta f)$ over a change in frequency (Δf) and a change in time (Δt). For example, the expectation computation can be expressed as follows:

$$R_{avg,i}(BW_i = 1, t_p) = \mathbb{E}_{\Delta f, \Delta t}\{R_i(BW_i = 1, t_p, \Delta f)\} = \quad \text{Eq. (10)}$$

$$\sum_{k=1}^{N_{tot}} (1-p)^{k-1} p|R_f(\Delta f = 0)||R_t(\Delta t = kt_p)|$$

Figure 11C:
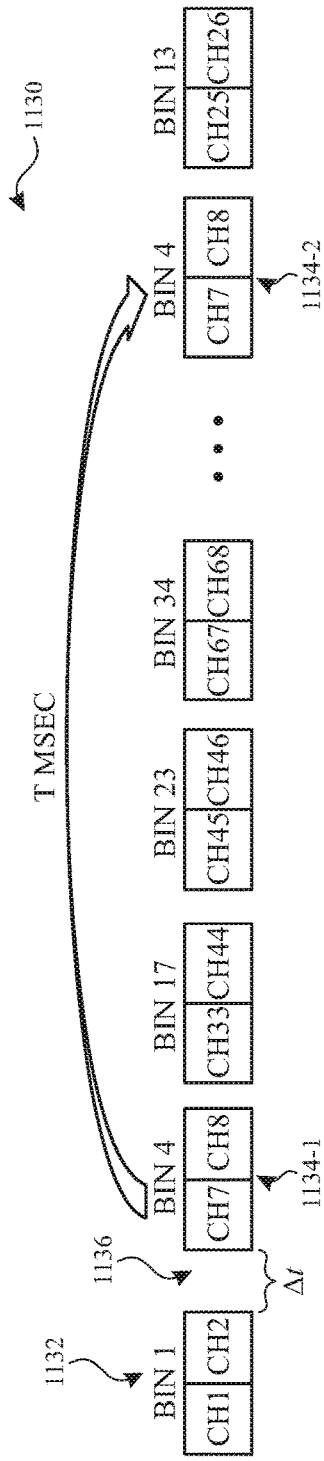
FIG. 11C conceptually illustrates an example of an adaptive binning framework having a second predetermined bin width according to one or more implementations of the subject technology.

FIG. 11C conceptually illustrates an example of an adaptive binning framework 1130 having a second predetermined bin width according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In FIG. 11C, the adaptive global binning framework 1130 includes a first bin 1132 (denoted as "Bin 1"), a second bin 1134-1 (denoted as "Bin 4"), and a third bin 1134-2 (denoted as "Bin 4"). In some aspects, the first bin 1132 and the second bin 1134-1 are spaced apart by a predetermined time difference 1136 denoted as Δt. As depicted in FIG. 11C, the second bin 1134-1 is the same bin as the third bin 1134-2 (i.e., returned after a predetermined return time). In the illustrated example of FIG. 11C, the first predetermined bin width is assumed to equal 2 MHz, in which each bin contains two channels. In this respect, the term $R_{avg,i}(BW_i=2, t_p, \Delta f)$ can be calculated as follows:

$$R_{avg,i}(BW_i = 2, t_p, \Delta f) = \quad \text{Eq. (11)}$$

$$\begin{cases} |R_f(\Delta f = 0)R_t(\Delta t = t_p)| + & \\ |R_f(\Delta f = 1)||R_t(\Delta t = t_p)| & \text{with prob. } p \\ |R_f(\Delta f = 0)||R_t(\Delta t = 2t_p)| + & \\ |R_f(\Delta f = 1)||R_t(\Delta t = 2t_p)| & \text{with prob. } (1-2p)p \\ |R_f(\Delta f = 0)||R_t(\Delta t = 3t_p)| + & \\ |R_f(\Delta f = 1)||R_t(\Delta t = 3t_p)| & \text{with prob. } (1-2p)^2 p \\ \vdots & \\ |R_f(\Delta f = 0)||R_t(\Delta t = N_h t_p)| + & \\ |R_f(\Delta f = 1)||R_t(T = N_h t_p)| & \text{with prob. } (1-2p)^{N_h-1} p \end{cases}$$

In some aspects, the time and frequency correlation expressions when Δf=0, represents the penalty of adding an adjacent channel to the computation. For example, in a bin, the correlation of a channel with itself (i.e., Δf=0) happens less frequently by adding adjacent channels to its bin. In some aspects, the time and frequency correlation expressions when Δf=1, represents the reward of adding an adjacent channel to the computation. For example, additional correlation can be determined by adding a neighboring node to a bin.

In some implementations, the term $R_{avg,i}(BW_i=2, t_p)$ is calculated by taking the expectation of $R_i(BW_i=2, t_p, \Delta f)$ over a change in frequency (Δf) and a change in time (Δt). For example, the expectation computation can be expressed as follows:

$$R_{avg,i}(BW_i=2,t_p) = \mathbb{E}_{\Delta f, \Delta t}\{R_i(BW_i=2, t_p, \Delta f)\}$$

$$= H(BW_i=2, t_p, \Delta f=0) + H(BW_i=2, t_p, \Delta f=1) \quad \text{Eq. (12)}$$

The term $H(BW_i, t_p, \Delta f)$ can be expressed as follows:

$$\sum_{k=1}^{N_{tot}} (1 - BW_i p)^{k-1} p|R_f(\Delta f)||R_t(\Delta t = kt_p)| \quad \text{Eq. (13)}$$

In some aspects, channel statistics (i.e., time correlation and frequency correlation functions) are known a priori based on simulated channel models. In other aspects, time correlation and frequency correlation functions can be calculated based on a measured channel response.

In some implementations, when new channel estimates are available, an update rule for a frequency correlation function can be expressed as follows:

$$R_{f,new}(\Delta f=\Delta f')=\alpha R_{f,prev}(\Delta f=\Delta f')+(1-\alpha)C_N(f_i,t)C^*_N(f_i-\Delta f',t-t_p) \quad \text{Eq. (14)}$$

Similarly, an update rule for a time correlation function can be expressed as follows:

$$R_{t,new}(\Delta t=\Delta t')=\alpha R_{t,prev}(\Delta t=\Delta t')+(1-\alpha)C_N(f_i,t)C^*_N(f_i,t-\Delta t') \quad \text{Eq. (15)}$$

Where α is a forgetting factor.

When a new MRC angle is available, instead of computing the whole $R_{avg}$ every time, adaptive iterative global binning can be performed. For a frequency update, the computation can be formulated as follows:

$$\Delta f'=|f-f'| \quad \text{Eq. (16)}$$

Where the term f corresponds to the current hopping frequency at a current time, k, and the term f' corresponds to the previous hopping frequency at time k-$t_p$.

The complex channel frequency response for the frequency update, denoted as $H_{new}(BW_i, t_p, \Delta f=\Delta f')$, can be expressed as follows:

$$H_{new}(BW_i, t_p, \Delta f = \Delta f') = \frac{|R_{f,new}(\Delta f = \Delta f')|}{|R_{f,prev}(\Delta f = \Delta f')|} H_{prev}(BW_i, t_p, \Delta f = \Delta f') \quad \text{Eq. (17)}$$

The frequency update based on the current hopping frequency and the previous hopping frequency can be formulated as follows:

$$\Delta_{u,f}=H_{new}(BW_i,t_p,\Delta f=\Delta f')-H_{prev}(BW_i,t_p,\Delta f=\Delta f') \quad \text{Eq. (18)}$$

The term $R_{avg,i}(BW_i, t_p)$ for the new MRC angle can be expressed as follows:

$$R_{avg,i}(BW_i, t_p) = \quad \text{Eq. (19)}$$
$$\begin{cases} R_{avg,i}(BW_i, t_p) + \Delta_{u,f} xBW_i & \text{if } \Delta f' = 0 \\ R_{avg,i}(BW_i, t_p) + & \text{if } \Delta f' \le BW_i - 1 \text{ and} \\ 2x(BW_i - \Delta f')x\Delta_{u,f} xBW_i & \Delta f' \ne 0 \end{cases}$$

For a time update, the computation can be formulated as follows:

$$k = \frac{\Delta t'}{\Delta t} \quad \text{Eq. (20)}$$

Where the term Δt' corresponds to the time difference between the current time and the previous measurement taken for the current hopping channel. In some aspects, if k≤$N^h$, then an update is computed for all bin-widths ($BW_i$) in a feasible set. Such computation can be formulated as follows:

$$\Delta_{u,t} = (|R_t, \text{new}(\Delta t = \Delta t')| - |R_{t,prev}(\Delta t = \Delta t')|)x(1 - Bw_i xp)^{k-1} x \quad \text{Eq. (21)}$$
$$px\left(BW_i x|R_f(\Delta f = 0)| + 2\sum_{\Delta f'=1}^{BW_i-1}(BW_i - \Delta f')|R_f(\Delta f = \Delta f')|\right)$$

In some aspects, the average correlation with the time update can be synthesized to the formulation as follows:

$$R_{avg,i}(BW_i,t_p)=R_{avg,i}(BW_i,t_p)+\Delta_{u,t} \quad \text{Eq. (22)}$$

In some implementations, adaptive local binning can be performed to select the bin-width in order to maximize correlation of phase values averaged over a number of channels in both time and frequency dimensions. The optimization of the bin-width can be formulated as follows:

$$BW_{opt} = \arg\max_{\substack{BW \in \{1,3,5,7,...\} \\ \text{given } t_p, N_{ch}}} R_{avg}(BW, t_p) \quad \text{Eq. (23)}$$

$$= \arg\max_{\substack{BW \in \{1,3,5,7,...\} \\ \text{given } t_p, N_{ch}}} \frac{1}{N_{ch}}(N_{bin} x R_{avg,b}(BW, t_p) + R_{avg,e}(BW, t_p)) \quad \text{Eq. (24)}$$

The optimization problem in the local binning is similar to that of global binning, however, the objective function $R_{avg}$ (BW, $t_p$) between the binning methods is different. In some aspects, the feasible bin-width set for global binning includes consecutive bin values {1, 2, 3, 4, ... }, whereas the feasible bin-width set for local binning includes odd number bin values {1, 3, 5, 7, ... }.

In some implementations, the average correlation per bin (with the exception of bins that contain high and low edge channels in a band), $R_{avg,b}(BW_i, t_p)$ can be formulated as follows:

$$R_{avg,b}(BW, t_p) = \quad \text{Eq. (25)}$$
$$H(BW, t_p, \Delta f = 0) + 2\sum_{\Delta f'=1}^{(BW-1)/2} H(BW, t_p, \Delta f = \Delta f')$$

The term H(BW, $t_p$, Δf) is the same as in global binning (see e.g., Equation (5)). In some aspects, the average correlation of bins that contain high-edge and low-edge channels in a band, $R_{avg,e}(BW_i,t_p)$, can be formulated as follows:

$$R_{avg,e}(BW, t_p) = [2 + (BW - 3)\mathbb{1}(BW > 3)]H(BW, t_p, \Delta f = 0) + \quad \text{Eq. (26)}$$
$$2\sum_{\Delta f'=1}^{BW-1} H(BW, t_p, \Delta f = \Delta f') +$$
$$\sum_{n=1}^{(BW-3)/2}\left(2\sum_{k=1}^{BW-1-n} H(BW, t_p, \Delta f = k) + 2\sum_{l=1}^{n} H(BW, t_p, \Delta f = l)\right)$$

If the condition inside the argument of $\mathbb{1}$ (•) is satisfied, then the value of the function is 1. Otherwise, it is 0. This condition can be expressed as follows:

$$\mathbb{1}(BW > 3) = \begin{cases} 1 & \text{if } BW > 3 \\ 0 & \text{if } BW \le 3 \end{cases}$$

When a new MRC angle is available, instead of computing $R_{avg,b}(BW, t_p)$ and $R_{avg,e}(BW, t_p)$, adaptive iterative local binning can be performed. For a frequency update, the computation can be formulated as follows:

$$\Delta f' = |f - f'|  \quad \text{Eq. (27)}$$

Where the term f corresponds to the current hopping frequency at a current time, k, and the term f' corresponds to the previous hopping frequency at time $k-t_p$.

The complex channel frequency response for the frequency update, denoted as $H_{new}(BW\ t_p, \Delta f = \Delta f')$, can be expressed as follows:

$$H_{new}(BW, t_p, \Delta f = \Delta f') = \quad \text{Eq. (28)}$$

$$\frac{|R_{f,new}(\Delta f = \Delta f')|}{|R_{f,prev}(\Delta f = \Delta f')|} H_{prev}(BW, t_p, \Delta f = \Delta f')$$

The frequency update based on the current hopping frequency and the previous hopping frequency can be formulated as follows:

$$\Delta_{u,f} = H_{new}(BW, t_p, \Delta f = \Delta f') - H_{prev}(BW, t_p, \Delta f = \Delta f') \quad \text{Eq. (29)}$$

The term $R_{avg,b}$ (BW, $t_p$) for the new MRC angle can be expressed as follows:

$$R_{avg,b}(BW, t_p) = R_{avg,b}(BW, t_p) + \Delta_f \text{ if } \Delta f' \leq \frac{BW - 1}{2} \quad \text{Eq. (30)}$$

The term $R_{avg,e}(BW, t_p)$ for the new MRC angle can be expressed as follows:

$$R_{avg,e}(BW, t_p) = \quad \text{Eq. (31)}$$

$$\begin{cases} R_{avg,e}(BW, t_p) + \\ [2 + (BW - 3)\mathbb{1}(BW > 3)]x\Delta_{u,f} & \text{if } \Delta f' = 0 \\ R_{avg,e}(BW, t_p) + \\ \left[2 + 2\sum_{k=1}^{\frac{BW-3}{2}} \mathbb{1}(\Delta f' \leq k) + \right. & \text{if } \Delta f' \leq BW - 1 \\ \left. 2\sum_{n=1}^{\frac{BW-3}{2}} \mathbb{1}(\Delta f' \leq (BW - 1 - n))\right]x\Delta_{u,f} & \text{and } \Delta f' \neq 0 \end{cases}$$

In some aspects, if $k \leq N^h$, then an update is computed for all bin-widths ($BW_i$) in a feasible set. Such computation can be formulated as follows:

$$\Delta_{u,t} = (|R_t, \text{new}(\Delta t = \Delta t')| - |R_{t,prev}(\Delta t = \Delta t')|)x(1 - BW_i xp)^{k-1} \quad \text{Eq. (32)}$$

$$xpx\left(|R_f(\Delta f = 0)| + 2\sum_{\Delta f'=1}^{(BW-1)/2} |R_f(\Delta f = \Delta f')|\right)$$

Where the term $\Delta t'$ corresponds to the time difference between the current time and the previous measurement taken for the current hopping channel.

In some aspects, the average correlation per bin (with the exception of bins that contain high and low edge channels in a band) having the time update can be synthesized to the formulation as follows:

$$R_{avg,b}(BW, t_p) = R_{avg,b}(BW, t_p) + \Delta_{u,t} \quad \text{Eq. (33)}$$

$$\Delta_{ue,t} = (|R_t, \text{new}(\Delta t = \Delta t')| - |R_{t,prev}(\Delta t = \Delta t')|)x(1 - BW_i xp)^{k-1} \quad \text{Eq. (34)}$$

$$xpx2x\left(\left[1 + \frac{(BW - 3)}{2}\mathbb{1}(BW > 3)\right]|R_f(\Delta f = 0)| + \right.$$

$$\sum_{\Delta f'=1}^{BW-1} |R_f(\Delta f = \Delta f')| +$$

$$\left.\sum_{n=1}^{(BW-3)/2}\left(\sum_{k=1}^{BW-1-n} |R_f(\Delta f = k)| + \sum_{l=1}^{n} |R_f(\Delta f = l)|\right)\right)$$

In some aspects, the average correlation of bins that contain high-edge and low-edge channels in a band having the time update can be synthesized to the formulation as follows:

$$R_{avg,e}(BW, t_p) = R_{avg,e}(BW, t_p) + \Delta_{ue,t} \quad \text{Eq. (35)}$$

Figure 11D:
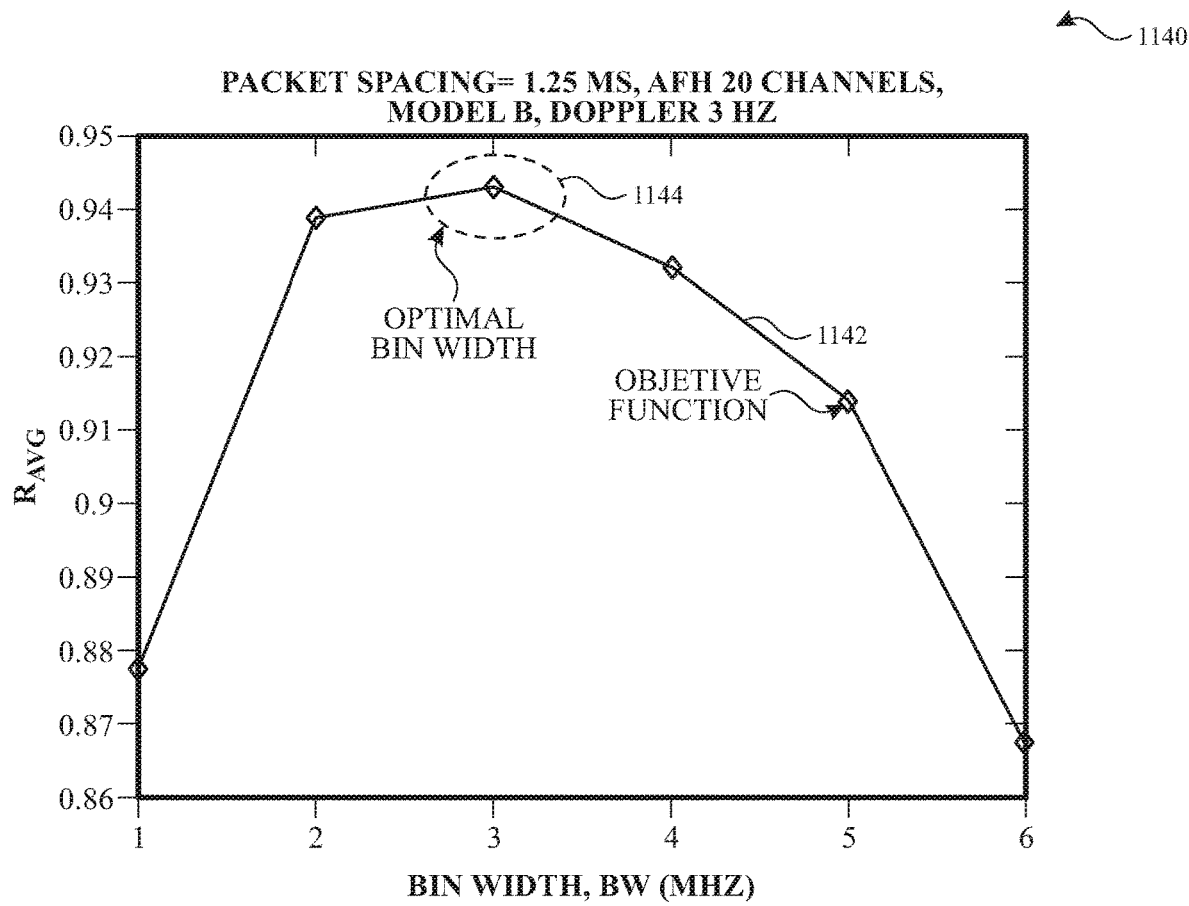
FIG. 11D illustrates a plot of an example curve representing the average correlation of phase values for different bin widths according to one or more implementations of the subject technology.

FIG. 11D illustrates a plot 1140 of an example curve 1142 representing the average correlation of phase values for different bin widths according to one or more implementations of the subject technology. In FIG. 11D, the Doppler frequency is 3 Hz and spacing is set to 1.25 ms. As depicted in FIG. 11D, the average correlation value first increases with increasing bin-width values and then starts decreasing due to penalty terms in the average correlation computation. Consequently, there is an optimal bin width that gives the highest average correlation. In the plot 1140, an optimal bin-width exists within a region 1144 of the curve 1142, where the average correlation value is highest. For example, the optimal bin-width is 3 MHz. In some aspects, the optimal bin-width may be in a range of 2 MHz to 4 MHz for a case where AFH includes 20 channels, but may vary depending on packet spacing, number of hopping channels, and/or wireless channel conditions.

Figure 12:
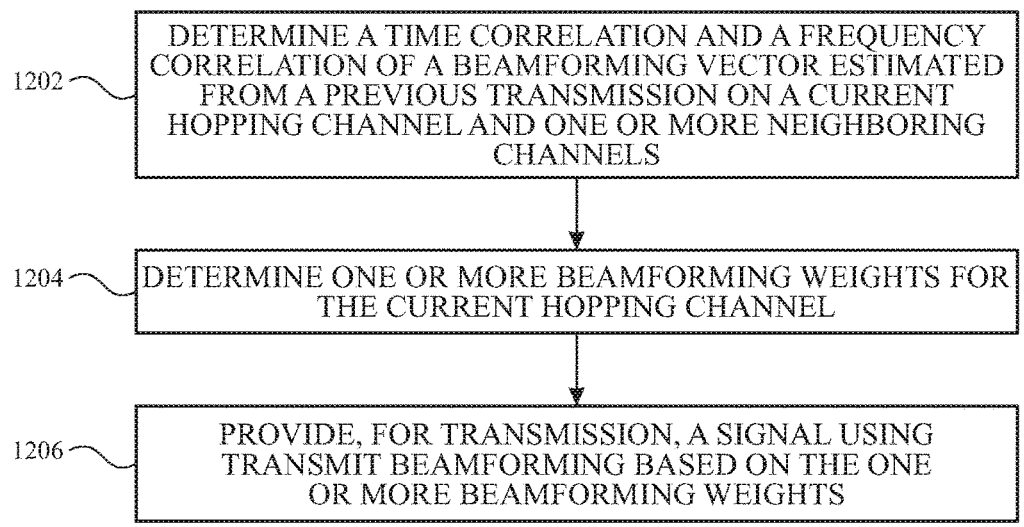
FIG. 12 illustrates a block diagram of a process for binning-based transmit beamforming according to one or more implementations of the subject technology.

FIG. 12 illustrates a block diagram of a process 1200 for binning-based transmit beamforming according to one or more implementations of the subject technology. For explanatory purposes, the process 1200 is primarily described herein with reference to the wireless communication portion 200 of FIG. 2 in accordance with the binning frameworks of FIGS. 7A-7C, 8A-8C and 11A-11C. However, the process 1200 is not limited to the wireless communication portion 200 of FIG. 2, and one or more blocks (or operations) of the process 1200 may be performed by one or more other components or circuits of wireless communication portion 200, such as the transmitter 201. Further for explanatory purposes, the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

The process 1200 starts at step 1202, where a time correlation and a frequency correlation of a beamforming vector estimated from a previous transmission on a current hopping channel and one or more neighboring channels are determined. Next, at step 1204, one or more beamforming weights for the current hopping channel are determined. Subsequently, at step 1206, a signal is provided for transmission using transmit beamforming based on the one or more beamforming weights.

Figure 13:
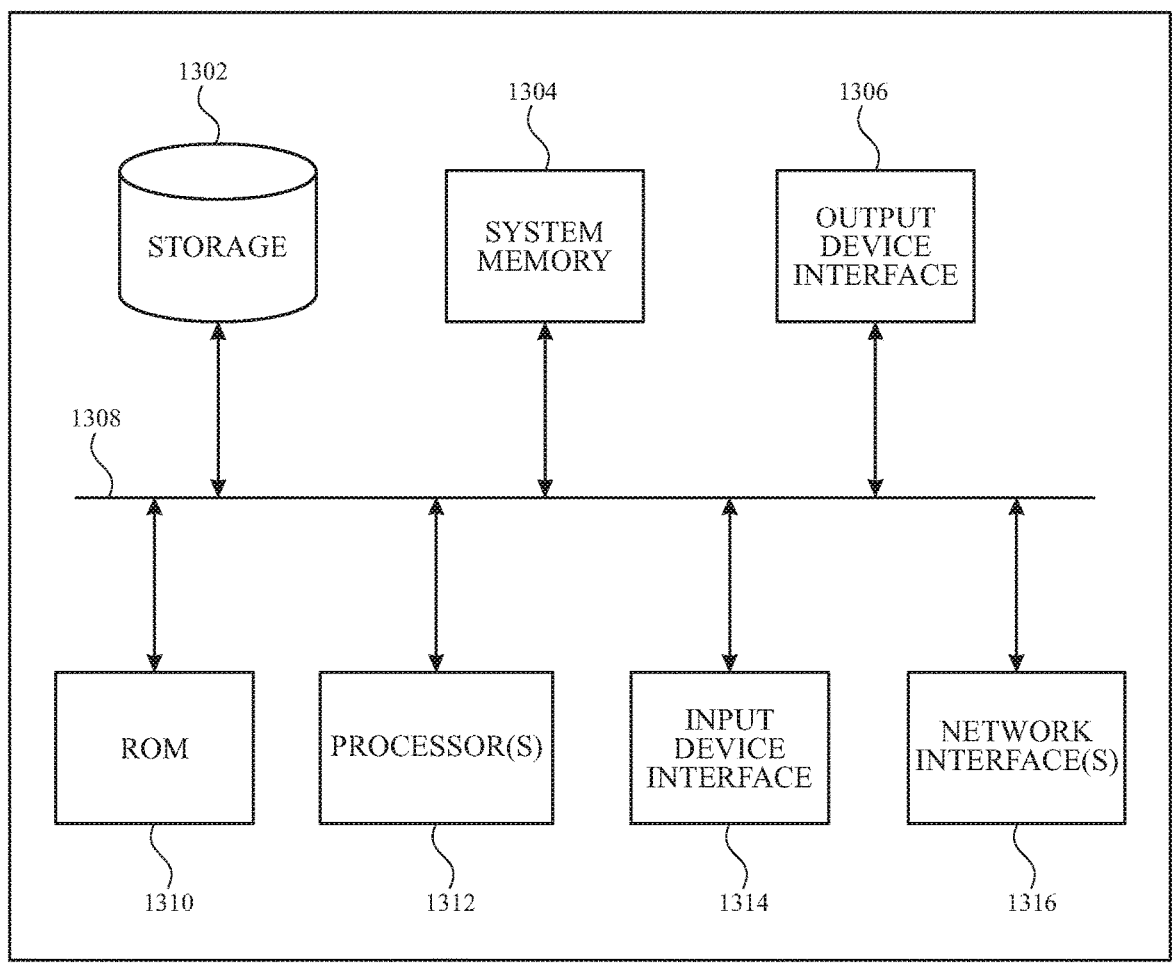
FIG. 13 conceptually illustrates an electronic system with which any implementations of the subject technology are implemented.

FIG. 13 conceptually illustrates an electronic system 1300 with which one or more implementations of the subject technology may be implemented. The electronic system 1300, for example, can be a network device, a media converter, a desktop computer, a laptop computer, a tablet computer, a server, a switch, a router, a base station, a receiver, a phone, or generally any electronic device that transmits signals over a network. Such an electronic system 1300 includes various types of computer readable media and interfaces for various other types of computer readable media. In one or more implementations, the electronic system 1300 is, or includes, one or more of the wireless communication devices 130-127 and BT devices 150-159. The electronic system 1300 includes a bus 1308, one or more processing unit(s) 1312, a system memory 1304, a read-only memory (ROM) 1310, a permanent storage device 1302, an input device interface 1314, an output device interface 1306, and a network interface 1316, or subsets and variations thereof.

The bus 1308 collectively represents all system, peripheral, and chipset buses that communicatively connect the numerous internal devices of the electronic system 1300. In one or more implementations, the bus 1308 communicatively connects the one or more processing unit(s) 1312 with the ROM 1310, the system memory 1304, and the permanent storage device 1302. From these various memory units, the one or more processing unit(s) 1312 retrieves instructions to execute and data to process in order to execute the processes of the subject disclosure. The one or more processing unit(s) 1312 can be a single processor or a multi-core processor in different implementations.

The ROM 1310 stores static data and instructions that are needed by the one or more processing unit(s) 1312 and other modules of the electronic system. The permanent storage device 1302, on the other hand, is a read-and-write memory device. The permanent storage device 1302 is a non-volatile memory unit that stores instructions and data even when the electronic system 1300 is off. One or more implementations of the subject disclosure use a mass-storage device (such as a magnetic or optical disk and its corresponding disk drive) as the permanent storage device 1302.

Other implementations use a removable storage device (such as a floppy disk, flash drive, and its corresponding disk drive) as the permanent storage device 1302. Like the permanent storage device 1302, the system memory 1304 is a read-and-write memory device. However, unlike the permanent storage device 1302, the system memory 1304 is a volatile read-and-write memory, such as random access memory. System memory 1304 stores any of the instructions and data that the one or more processing unit(s) 1312 needs at runtime. In one or more implementations, the processes of the subject disclosure are stored in the system memory 1304, the permanent storage device 1302, and/or the ROM 1310. From these various memory units, the one or more processing unit(s) 1312 retrieves instructions to execute and data to process in order to execute the processes of one or more implementations.

The bus 1308 also connects to the input device interface 1314 and the output device interface 1306. The input device interface 1314 enables a user to communicate information and select commands to the electronic system. Input devices used with the input device interface 1314 include, for example, alphanumeric keyboards and pointing devices (also called "cursor control devices"). The output device interface 1306 enables, for example, the display of images generated by the electronic system 1300. Output devices used with the output device interface 1306 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 13, the bus 1308 also couples the electronic system 1300 to one or more networks (not shown) through one or more network interfaces 1316. In this manner, the computer can be a part of one or more network of computers (such as a local area network ("LAN"), a wide area network ("WAN"), or an Intranet, or a network of networks, such as the Internet. Any or all components of the electronic system 1300 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method of transmit beamforming, the method comprising:
   determining a time correlation and a frequency correlation of a beamforming vector estimated from a previous transmission on a current hopping channel and one or more neighboring channels;

determining one or more beamforming weights for the current hopping channel based on the determined time correlation and frequency correlation of the estimated beamforming vector; and providing, for transmission, a signal using transmit beamforming based on the one or more beamforming weights.

2. The method of claim 1, wherein the one or more neighboring channels have a beamforming vector that corresponds to that of the current hopping channel based on a channel coherence bandwidth.

3. The method of claim 1, further comprising:
grouping the current hopping channel and the one or more neighboring channels into a same bin.

4. The method of claim 1, further comprising:
obtaining a most recent estimate of the beamforming vector in a bin, wherein the time correlation and the frequency correlation of the beamforming vector is determined from the most recent estimate.

5. The method of claim 1, further comprising:
forming a bin that includes a number of channels, wherein the number of channels grouped into a bin is determined by a bin-width parameter.

6. The method of claim 1, further comprising:
determining whether a new beamforming vector estimate is obtained from at least one of a plurality of channels grouped in a same bin; and
updating a beamforming vector in each bin of a plurality of bins when the new beamforming vector estimate is obtained.

7. The method of claim 1, further comprising:
grouping consecutive channels into a plurality of bins for a first type of binning architecture, wherein each of the plurality of bins excludes common channels.

8. The method of claim 1, further comprising:
grouping consecutive channels into a plurality of bins for a second type of binning architecture, wherein each bin of the plurality of bins is formed locally around a center specified by a respective channel of the consecutive channels.

9. The method of claim 8, wherein overlapping channels exist across the plurality of bins.

10. The method of claim 8, wherein the second type of binning architecture utilizes frequency correlation of beamforming vectors of the one or more neighboring channels.

11. The method of claim 8, wherein phase estimates in a bin centered at a first channel and one or more neighboring bins that contain the first channel are updated.

12. The method of claim 1, further comprising:
determining a first bin centered at a channel that has a new phase estimate; and
updating a phase estimate in the first bin and one or more bins neighboring the first bin with the new phase estimate.

13. The method of claim 1, further comprising:
determining that a new beamforming vector estimate is available for one or more bins;
adaptively calculating one or more objective functions based on a change in a channel condition associated with the one or more bins; and
determining an optimal bin-width using the adaptively calculated one or more objective functions.

14. The method of claim 1, further comprising:
determining that a new beamforming vector estimate is available for one or more bins;

calculating iteratively correlation values of one or more beamforming vectors in time and frequency dimensions based on a previous correlation value; and
determining an optimal bin-width using the iteratively calculated correlation values.

15. The method of claim 1, further comprising:
for each bin-width from a plurality of candidate bin-widths, through an offline exhaustive search:
determining whether the bin-width reduces a packet error rate for a given channel profile;
selecting the bin-width that reduces the packet error rate; and
applying the selected bin-width as a fixed bin-width during operation.

16. The method of claim 1, wherein a phase estimate in a bin is updated in response to a new phase estimate obtained from one or more channels in a same bin.

17. The method of claim 1, further comprising:
determining whether a return time to a same frequency is greater than a channel coherence time; and
determining that a last phase estimate of a current hopping frequency is valid when the return time to the same frequency is not greater than the channel coherence time.

18. The method of claim 1, further comprising:
selecting a bin width that maximizes correlation of phase values averaged over a number of channels in both time and frequency dimensions.

19. A computer program product comprising a nontransitory computer-readable storage medium including stored instructions, the stored instructions comprising:
instructions to determine a time correlation and a frequency correlation of a beamforming vector estimated from a previous transmission on a current hopping channel and one or more neighboring channels;
instructions to group the current hopping channel and the one or more neighboring channels into a same bin based on the determined time correlation and frequency correlation of the estimated beamforming vector;
instructions to determine one or more beamforming weights in the same bin for the current hopping channel; and
instructions to provide, for transmission, a transmission signal using the one or more beamforming weights.

20. The computer program product of claim 19, wherein the instructions further comprise:
instructions to divide an allocation of non-overlapping channels into a plurality of bins based on a bin-width parameter.

21. The computer program product of claim 20, wherein consecutive channels of the allocation of non-overlapping channels are grouped into respective ones of the plurality of bins.

22. The computer program product of claim 20, wherein consecutive channels of the allocation of non-overlapping channels are grouped with intervals determined by the bin-width parameter.

23. The computer program product of claim 19, wherein the instructions further comprise:
instructions to utilize a same estimate of the beamforming vector for channels grouped in a same bin.

24. A device comprising:
processing circuitry that is configured to:
determine a time correlation and a frequency correlation of a beamforming vector estimated from a previous transmission on a current hopping channel and one or more neighboring channels;

group the current hopping channel and the one or more neighboring channels into a bin based on the determined time correlation and frequency correlation of the estimated beamforming vector;

determine one or more beamforming weights for the current hopping channel; and provide, for transmission, a transmission signal using the one or more beamforming weights.

25. The device of claim 24, wherein the processing circuitry is further configured to group consecutive channels into a plurality of bins for a first type of binning architecture, wherein each of the plurality of bins excludes common channels.

26. The device of claim 24, wherein the processing circuitry is further configured to group consecutive channels into a plurality of bins for a second type of binning architecture, wherein each bin of the plurality of bins is formed locally around a center specified by a respective channel of the consecutive channels.

27. The device of claim 24, wherein channels grouped in a same bin utilize a same phase estimate for transmit beamforming.

\* \* \* \* \*